(12) United States Patent
Dendo

(10) Patent No.: US 8,756,758 B2
(45) Date of Patent: Jun. 24, 2014

(54) FASTENING ASSEMBLY FOR SECURING FLOOR MAT TO CARPET

(71) Applicant: Newfrey LLC, Newark, DE (US)

(72) Inventor: Masashi Dendo, Toyohashi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 13/740,617

(22) Filed: Jan. 14, 2013

(65) Prior Publication Data
US 2013/0125341 A1 May 23, 2013

Related U.S. Application Data

(62) Division of application No. 12/711,786, filed on Feb. 24, 2010, now Pat. No. 8,375,514.

(30) Foreign Application Priority Data

Feb. 25, 2009 (JP) ................................ 2009-042044

(51) Int. Cl.
*A47G 27/04* (2006.01)
(52) U.S. Cl.
USPC ............ 16/4; 16/8; 411/344; 24/453; 24/662; 296/97.23
(58) Field of Classification Search
CPC .... A47G 27/0418; B60N 3/044; B60N 3/046; B60R 13/0206; F16B 5/0642; F16B 21/086
USPC ......... 16/2.1, 4, 6, 8; 411/344, 508, 509, 553, 411/555, 913; 24/297, 453, 662, 90.5, 24/581.11; 296/97.23; 52/506.05
See application file for complete search history.

(56) References Cited

U.S. PATENT DOCUMENTS

| | | | | |
|---|---|---|---|---|
| 3,407,454 | A * | 10/1968 | Myatt | 411/549 |
| 4,878,792 | A * | 11/1989 | Frano | 411/339 |
| 5,195,857 | A * | 3/1993 | Hiramoto | 411/344 |
| 5,362,187 | A * | 11/1994 | Scalise | 411/555 |
| 5,511,919 | A * | 4/1996 | Scalise | 411/555 |
| 5,775,859 | A * | 7/1998 | Anscher | 411/38 |
| 6,381,806 | B1 * | 5/2002 | Stanesic et al. | 16/4 |
| 6,497,003 | B2 * | 12/2002 | Calabrese | 16/4 |
| 6,612,795 | B2 * | 9/2003 | Kirchen | 411/508 |
| 6,735,819 | B2 * | 5/2004 | Iverson et al. | 16/4 |
| 6,757,945 | B2 * | 7/2004 | Shibuya et al. | 24/662 |
| 7,546,661 | B2 * | 6/2009 | Connor, Jr. | 16/4 |
| 7,945,992 | B2 * | 5/2011 | Parisi et al. | 16/4 |

* cited by examiner

*Primary Examiner* — William Miller
(74) *Attorney, Agent, or Firm* — Michael P. Leary

(57) ABSTRACT

A fastening assembly for securing a floor mat to a carpet in a vehicle includes a first fastener that is attached to the carpet, a knob that is attached to the first fastener, and a second fastener that is attached to a floor mat. A knob base is integrally provided in a first carpet grommet of the first fastener. The knob comprises a knob shank that is coupled to be able to turn about its axis inside the knob base between an unlocked position and a locked position. The knob base includes projections which fit into and mate with channels in knob coupling latching pawls of the knob base; thus, the knob holding force is enhanced, and a clicking sensation confirms completion of the attachment operation.

5 Claims, 40 Drawing Sheets

FASTENING ASSEMBLY FOR SECURING FLOOR MAT TO CARPET

CROSS-REFERENCE TO RELATED APPLICATIONS

This application is a divisional of U.S. application Ser. No. 12/711,786, filed Feb. 24, 2010, now U.S. Pat. No. 8,375,514, which claims the benefit of Japanese Application No. 2009-042044 filed Feb. 25, 2009, the disclosure of which is incorporated herein by reference.

BACKGROUND OF THE INVENTION

The present invention relates to a fastening assembly for securing a floor mat to a carpet in an automobile.

Fastening assemblies for securing floor mats to floor panels in automobiles are described, for example, in Patent Literature 1. A male fastener is secured to a floor panel, a female fastener is secured to a floor mat, a projecting part extending from the male fastener is inserted into a keyhole-shaped latching hole in the female fastener, then the floor mat is slid along the floor panel, and, thereby, the floor mat is secured to the floor.

Prior art references discussed herein include:

Patent Literature 1: TOKKAI [Unexamined Patent Appln.] No. 2004-268731 (Gazette)

Patent Literature 2: Design Registration No. 1281521 (Gazette)

Patent Literature 3: JIKKAI [Examined Patent Appln.] No. H4-075208/1992 (Gazette)

Patent Literature 4: TOKKAI No. 2008-308085 (Gazette)

In the fastening assembly described in Unexamined Japanese Patent Appln. No. 2004-268731, in order to secure a floor mat, the securing operation requires that a male fastener be inserted in a perpendicular direction into a female fastener and then slid in a horizontal direction. This securing operation is troublesome.

The fastening assembly for securing a floor mat to a carpet described in Japanese Design Registration No. 1281521 has a slender plate-form main body, in which main body there is a mat attachment part for attaching a floor mat on the front surface at one end and a carpet securing part on the back surface at the other end. Because the mat attachment part and the carpet securing part are not in the same position but are at separated positions, the mat attaching operation with this fastening assembly is troublesome; moreover, because the carpet securing part cannot be hidden, its appearance is also a problem. Furthermore, in order to attach the mat attachment part to a floor mat, a pair of eye-hole (grommets) is attached for holding the floor mat from both sides into the through-holes in which the mat attachment part is inserted to effect securing, but only an elastic latching pawl is what joins this with the grommets, so there is a danger of the mat attachment part pulling out. For adequate strength, the latching pawl must be made thick. However, when the latching pawl is made thick, great force is required in the joining operation, so joining is difficult.

In examined Japanese Patent Application No. H4-075208 (1992), a fastening assembly for attaching a decorative board to a panel board is described. With this fastening assembly, the decorative board is positioned so as to line up with an attachment hole in the panel board, a shank of the fastening assembly is inserted into two attachment holes and then turned 90 degrees, for example, about its axis to secure the decorative board to the panel board. With this fastening assembly, the joining operation is difficult because there is no pre-attachment to the decorative board.

In unexamined Japanese Patent Application No. 2008-308085, a fastening assembly for an automobile mat is described, comprising a first clip attached to a floor panel, which is secured to a pad that the workpiece is being attached to, a second clip for supporting a mat secured to the pad, a mat fastener secured to the mat and an attachment knob for coupling the second clip to the mat fastener. The first clip has a tubular coupling part for coupling the fastener supporting the pad to the second clip. The second clip has a tubular coupling part for coupling to the coupling part of the first clip in a nesting manner. In order to couple the mat to the second clip, a hole in a holding part of the mat fastener secured to the mat is made to pass over the attachment knob coupled to the second clip and is turned about the axis from an unlocked position to a locked position. In order to secure the mat to the pad that is the workpiece, all that need be done is to push the linking part of the second clip that supports the mat into the linking part of the first clip secured to the pad. Consequently, the configuration effects latching or securing to the workpiece at a position where there is an attachment hole in the mat, not only preventing the mat position from shifting, but the mat can be accurately secured and maintained in the attachment position on the workpiece, and appearance is also good. In such a fastening assembly, it is desirable to enhance the holding force of the attachment knob after the mat has been secured to the pad. It is also desirable that, when manipulating the attachment knob, the operator feel that the securing operation is finished.

BRIEF SUMMARY OF THE INVENTION

Accordingly, an object of the present invention is to provide a fastening assembly for securing a floor mat to a carpet, whereby the joining operation is easy, separation after joining can be prevented, the holding force of an attachment knob can be enhanced and the operator feels that by manipulating the knob, the securing operation is finished.

In order to attain that object, the fastening assembly relating to the present invention for securing a floor mat to a carpet comprises a first fastener that attaches to the peripheral portion of an attachment hole in the carpet, a knob that attaches to the first fastener and a second fastener that attaches to the peripheral portion of an attachment hole in the floor mat and that has a through-hole in its center, wherein the first fastener comprises a first carpet grommet and a second carpet grommet for clamping the peripheral portion of the attachment hole in the carpet from both sides; the first carpet grommet and second carpet grommet have a first carpet grommet flange and a second carpet grommet flange for abutting against the peripheral portion of the carpet attachment hole, and latching means capable of mutually coupling the first carpet grommet and second carpet grommet in a state wherein the carpet is clamped between them; in the second carpet grommet flange, a knob base is formed for accepting the knob and coupling to the knob; the knob base is erected, from the second carpet grommet flange, as a tubular body with a space in the center of which a knob acceptance hole is formed to receive the knob; and in the first carpet grommet flange, a through hole is formed for the knob base to pass through; the knob and knob base are formed so that, when the knob is inserted into the knob base, the knob is coupled to the knob base and can turn about its axis inside the knob base; the knob comprises a knob head of a size that can abut against the peripheral portion of the through hole in the second fastener, and a knob shank that is inserted into the knob base; the knob base comprises a base fastening part, formed on the outside of the tubular body, for fastening to fastening means in the first carpet grommet, and knob coupling fastening pawls, formed on the inside of the tubular body, for latching to latching means in the knob shank inserted into the knob acceptance hole; the knob shank is configured so it can turn about its axis inside the knob base and assume an unlocked position or a locked position; and, in a state wherein the first carpet grommet and the second carpet grommet of the first fastener are attached in order to clamp both sides of the carpet, the second fastener is attached to the floor mat, the knob is coupled to the knob base, the knob head has passed through the through hole in the second fastener, the second fastener of the floor mat is superimposed on the first carpet grommet of the first fastener of the carpet, and in a state wherein the knob has been turned about its axis from the unlocked position to the locked position, the knob head abuts against the fastening part formed in the second fastener and pushes the second fastener in the axial direction against the first fastener, whereupon the floor mat is secured to the carpet.

In the fastening assembly described above, the first fastener is attached to the carpet, the second fastener is attached to the floor mat, the knob is secured to the knob base of the first fastener, the knob head of the knob latches to the second fastener, and, merely by turning the knob from the unlocked position to the locked position, the floor mat is secured to the carpet; thus facilitating the operation of combining the floor mat with the carpet, separating them after being combined can be prevented, and the holding force of the attachment knob can also be enhanced. Moreover, the knob is such that its center axis can be disposed in the centers of the first fastener and the second fastener so that combining takes place at one place, and thus not only is the combining operation easy, but appearance thereafter is good.

In the fastening assembly described above, the knob coupling latching pawls of the knob base are formed in an opposing pair, as elastic latching pawls that extend in the longitudinal direction along the inside wall of the knob acceptance hole into which the knob shank is inserted; in the knob shank, latching shoulders for latching with the knob coupling latching pawls are formed as the latching means; and the knob coupling latching pawls are formed so as to have sufficient size and strength to definitely latch on the latching shoulders of the knob shank. In this way, the strength of the coupling of the knob to the knob base is reinforced by the high-strength knob coupling latching pawls. In the fastening shoulders of the knob shank, projections protruding in the axial direction from the latching shoulder are formed; in the knob coupling latching pawls of the knob base, channels are formed in the axial direction for accepting the projections; and the channels are disposed in a position in which the projections are accepted when the knob shank is in the locked position. Furthermore, the projections of the knob shank and the channels in the knob base are formed so that when the knob shank is turned to the locked position, the projections are elastically mated in the channels by the elasticity of the knob coupling latching pawls. In this way, when manipulating the knob, the operator can feel a clicking when turning to the locked position at the conclusion of the securing operation. When this is the case, the projections of the knob shank and the channels in the knob base are formed so that, in the mated state, the projections fill up the channels in the lateral cross-section of the knob shank. In this way, turning is locked in the locked position, and play in the turning direction can be prevented.

Additionally, each of the pair of knob coupling latching pawls is formed in a plate shape extending from the base apex part of the knob base of the tubular body toward the second carpet grommet flange; the channels forming the outer contour of the knob acceptance hole are formed in the axial direction, intermediately in the width direction of the knob coupling latching pawls; and the knob coupling latching pawls are formed as thin plates in the channel portion, readily flexing outwardly when the knob shank is inserted into the knob acceptance hole, facilitating insertion of the knob shank. The knob shank is formed in a rod shape from the knob head to the position of the latching shoulder; the portion from the latching shoulder to the tip end is formed as a plate-shaped body having a rectangular lateral cross-section; the knob shank portion of the plate-shaped body is formed so that its width on the long sides of the rectangular lateral cross-section is equal to or slightly less than the length of the lateral cross-section inside the knob base; and play between the knob and knob base (and, by extension, the first fastener as well) in the locked position can be prevented. Further, because play can be prevented, the knob is firmly secured to the first fastener via the knob base, such that even if the floor mat is pulled to separate the fastening assembly, that pulling force can be withstood by the strong holding force.

The first carpet grommet is disposed on the front side of the carpet; the second carpet grommet is disposed on the back side of the carpet; and the knob is inserted into the knob base formed in the second carpet grommet and coupled to the second carpet grommet. The second fastener comprises a first mat grommet and a second mat grommet for clamping the peripheral portion of the attachment hole of the floor mat from both sides; and the first mat grommet and second mat grommet, respectively, are provided with a flange that abuts against the peripheral portion of the attachment hole of the floor mat, with latching means capable of mutually coupling in the state in which the floor mat is clamped. In either the first mat grommet or the second mat grommet in the inner wall of the through hole is formed the latching part against which the knob head abuts. The latching part of the second fastener is formed of a plate-shaped body that broadens to the inside from the inner wall surface of the through hole; in the latching part, a long hole is formed through which the knob head can pass; and the long hole is formed in a shape through which the knob head can pass when the knob is in the unlocked position, but against which the knob head abuts and through which the knob head cannot pass when in the locked position. In the knob head, a finger grip is formed for turning the knob shank about its axis. Also, the turning of the knob about its axis from the unlocked position to the locked position may be through an angle of 90 degrees in a typical example.

Moreover, in order to attain the object stated above, the present invention provides a fastening assembly for securing a floor mat to a carpet, comprising a first fastener attaching to the peripheral portion of an attachment hole in the carpet, and that has a through hole in its center; a knob assembly attaching to the first fastener by being inserted into the through hole in the first fastener; and a second fastener attaching to the peripheral portion of an attachment hole in the floor mat and that has a through-hole in its center; wherein the knob assembly comprises a knob base inserted into the through hole of the first fastener and is coupled to the first fastener and a knob coupled to the knob base; the knob base is formed as a tubular body inserted into the through hole of the first fastener and that has a knob acceptance hole in its center for receiving the knob, in which knob is formed, on the outside surface of the portion inserted into the through hole of the first fastener, a base flange that abuts against the peripheral portion of the through hole of the first fastener, and base latching pawls for latching with a latching part formed in the inner wall of the through hole of the first fastener; the knob and knob base are formed such that, when the knob is inserted into the knob base, the knob is coupled to the knob base in order to be able to turn about its axis inside the knob base; the knob comprises a knob head for abutting against the peripheral portion of the through hole in the second fastener, and latching means inserted into the knob base for latching to the knob base; the knob shank is formed in a shape such that, when turned through a prescribed angle about the axis of the knob shank inside the knob base, the base latching pawls are prevented from inwardly toppling and is configured in order to be able to turn about its axis to assume an unlocked position in which the inward toppling is not prevented or a locked position in which inward toppling is prevented; and in a state where the first fastener is attached to the carpet, the second fastener is attached to the floor mat, the knob assembly is coupled to the first fastener in order not to turn about the axis of the knob shank, and the knob head of the knob passes through the through hole of the second fastener, the second fastener of the floor mat is superimposed on the first fastener of the carpet, and in a state where the knob has been turned about its axis from the unlocked position to the locked position, the knob head abuts against the fastening part formed in the second fastener and pushes the second fastener in the axial direction against the first fastener; then engagement between the base latching pawls of the knob base and the latching part of the first fastener is locked, and the floor mat is secured to the carpet.

Furthermore, in the fastening assembly described above, the first fastener is attached to the carpet, the second fastener is attached to the floor mat, the knob assembly comprising the knob and the knob base is secured to the first fastener, the knob head of the knob latches to the second fastener, and merely by turning the knob from the unlocked position to the locked position, the floor mat is secured to the carpet, thus facilitating the operation of combining the floor mat with the carpet, preventing separation after being combined, and the holding force of the attachment knob can also be enhanced. Moreover, the knob is such that its center axis can be disposed in the centers of the first fastener and the second fastener, thus not only facilitating the combining operation, but appearance thereafter is good. Because the knob base is secured to the first fastener with this fastening assembly, although it is necessary to secure the knob assembly to the knob base, the necessity of integrally molding the knob base to one of the carpet grommets of the first fastener is eliminated, thus simplifying the molding die of the first fastener and reducing costs.

In the knob shank and the knob base in the fastening assembly described above, latching means are formed for coupling the knob to the knob base when the knob shank is inserted into the knob base; the latching means of the knob base are formed by elastic knob coupling latching pawls that extend in the axial direction inside the knob base from the base apex part of the knob base; and the latching means of the knob shank are formed by latching shoulders for latching with the knob coupling latching pawls. In this way, the knob assembly is integrated and can be handled as a single part. The knob coupling latching pawls of the knob base are formed in an opposing pair, as elastic latching pawls extending in the longitudinal direction along the inside wall of the knob acceptance hole into which the knob shank is inserted; and the knob coupling latching pawls are formed in sufficient size and strength to definitely latch on the latching shoulders of the knob shank. In this way, the strength of the coupling of the knob to the knob base is maintained even higher by the high-strength knob coupling latching pawls. In the fastening shoulders of the knob shank, projections that protrude in the axial direction from the latching shoulders are formed; in the knob coupling latching pawls of the knob base, channels are formed in the axial direction for accepting the projections; and the channels are disposed in positions at which the projections are received when the knob shank is in the locked position. When that is the case, the projections of the knob shank and the channels in the knob base are formed so that, when the knob shank is turned to the locked position, the projections are elastically mated in the channels by the elasticity of the knob coupling latching pawls. In this way, when manipulating the knob, the operator definitely feels the clicking sensation of turning to the locked position that occurs at the conclusion of the securing operation. Also, the projections of the knob shank and the channels in the knob base, when mated as described above, are shaped such that the projections fill up the channels in the lateral cross-section of the knob shank. In this way, turning is locked in the locked position, and play in the turning direction can be prevented.

Further, each of the pair of knob coupling latching pawls is formed in a plate shape which extends from the base apex part of the knob base of the tubular body toward the second carpet grommet flange; the channels forming the outer contour of the knob acceptance hole are formed in the axial direction, intermediately in the width direction of the knob coupling latching pawls; and the knob coupling latching pawls are formed as thin plates in the channel portion, which pawls readily flex outwardly when the knob shank is inserted into the knob acceptance hole, facilitating insertion of the knob shank. The knob base is formed in a tubular body having a rectangular or oblong lateral cross-section, and the through hole of the first fastener is formed in a rectangular or oblong shape such that the knob base of the tubular body is accepted so that it can pass through but cannot turn about its axis. In the two outside surfaces running along the long sides of the lateral cross-section of the tubular body portion of the knob base, base latching pawls are formed for latching to the latching part formed on the inner wall of the through hole of the first fastener. The knob shank is formed in a rod shape from the knob head to the position of the latching shoulder; the portion from the latching shoulder to the tip end is formed as a plate-shaped body having a rectangular lateral cross-section; the knob shank portion of the plate-shaped body is formed so that its width on the long sides of the rectangular lateral cross-section is equal to or slightly less than the length of the lateral cross-section inside the knob base; and when the knob shank is in the locked position, the knob shank portion of the plate-shaped body prevents the base latching pawls of the knob base from toppling toward the inside of the knob base; engagement between the base latching pawls and the latching means of the first carpet grommet is locked. In this way, play between the knob in the locked position and the knob base (and, by extension, the first fastener also) can be prevented. Also, because play can be prevented, the knob is firmly secured to the first fastener through the knob base; thus, even if the floor mat is pulled so that the fastening assembly would become separated, that pulling force can be withstood by the strong holding force.

The first fastener described above comprises a first carpet grommet and a second carpet grommet which clamp the peripheral portion of an attachment hole in a carpet from both sides, and the first carpet grommet and second carpet grommet, respectively, have flanges which abut against the peripheral portion of the carpet attachment hole, and latching means capable of mutually coupling when the carpet is clamped. In the inner wall of the through hole in either the first carpet grommet or the second carpet grommet, the latching part to which the base latching pawls of the knob base latch is formed. The first carpet grommet is disposed on the front surface of the carpet, the second carpet grommet is disposed on the back surface of the carpet, the knob assembly is configured to be inserted from the first carpet grommet into the second carpet grommet and coupled to the first fastener, and the latching part is formed in the first carpet grommet; thus, the first fastener is coupled. The second fastener comprises a first mat grommet and a second mat grommet which clamp the peripheral portion of an attachment hole in a floor mat from both sides. The first mat grommet and the second mat grommet, respectively, are provided with flanges that abut against the peripheral portion of the attachment hole in the floor mat, and latching means capable of mutually coupling when the floor mat is so clamped. In the inner wall of the through hole in either the first carpet grommet or the second mat grommet, the latching part against which the knob head abuts is formed. The latching part of the second fastener is formed in a plate-shaped body that widens to the inside from the inner wall surface of the through hole. In the latching part, a long hole through which the knob head can pass is formed. The long hole is formed in a shape such that the knob head can pass through when the knob is in the unlocked position, but such that when in the locked position, the knob head abuts against it and cannot pass through.

Based on the present invention as described in the foregoing, the operation of combining a floor mat with a carpet is facilitated, separation after such combining can be prevented, the holding force of the knob can be enhanced, and appearance is good after being combined by the fastening assembly. Further, because knob coupling latching pawls for coupling the knob to the knob base can be formed in a knob base affording large interior space, the knob itself can be made stronger, the knob coupling latching pawls of the knob base can be formed so as to readily flex, making the coupling to the knob stronger, preventing play in the direction of knob turning, and preventing play in the locked position, thus definitely preventing separation caused by pulling on the floor mat.

Figure 38:
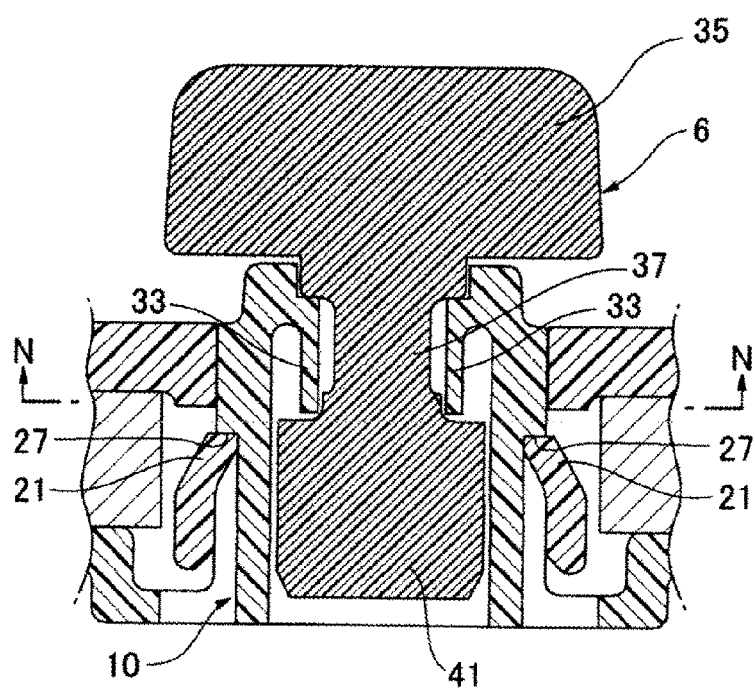
FIG. 38 is a section at the L-L line in FIG. 36(C) which illustrates the state when the knob has been turned to the locked position.

37, as the knob is being turned to the locked position, and (C) being a section at the N-N line in FIG. 38, in the locked position.

Figure 40:
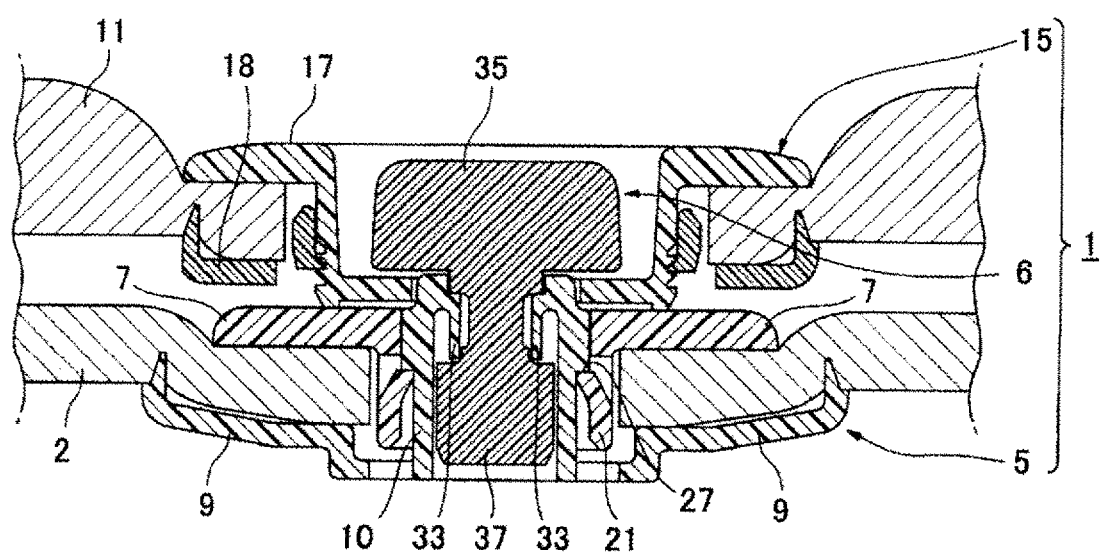

FIG. 40 is a section showing the manner in which the fastening assembly is used in securing a floor mat to a carpet in accordance with the first embodiment of the present invention.

Figure 41:
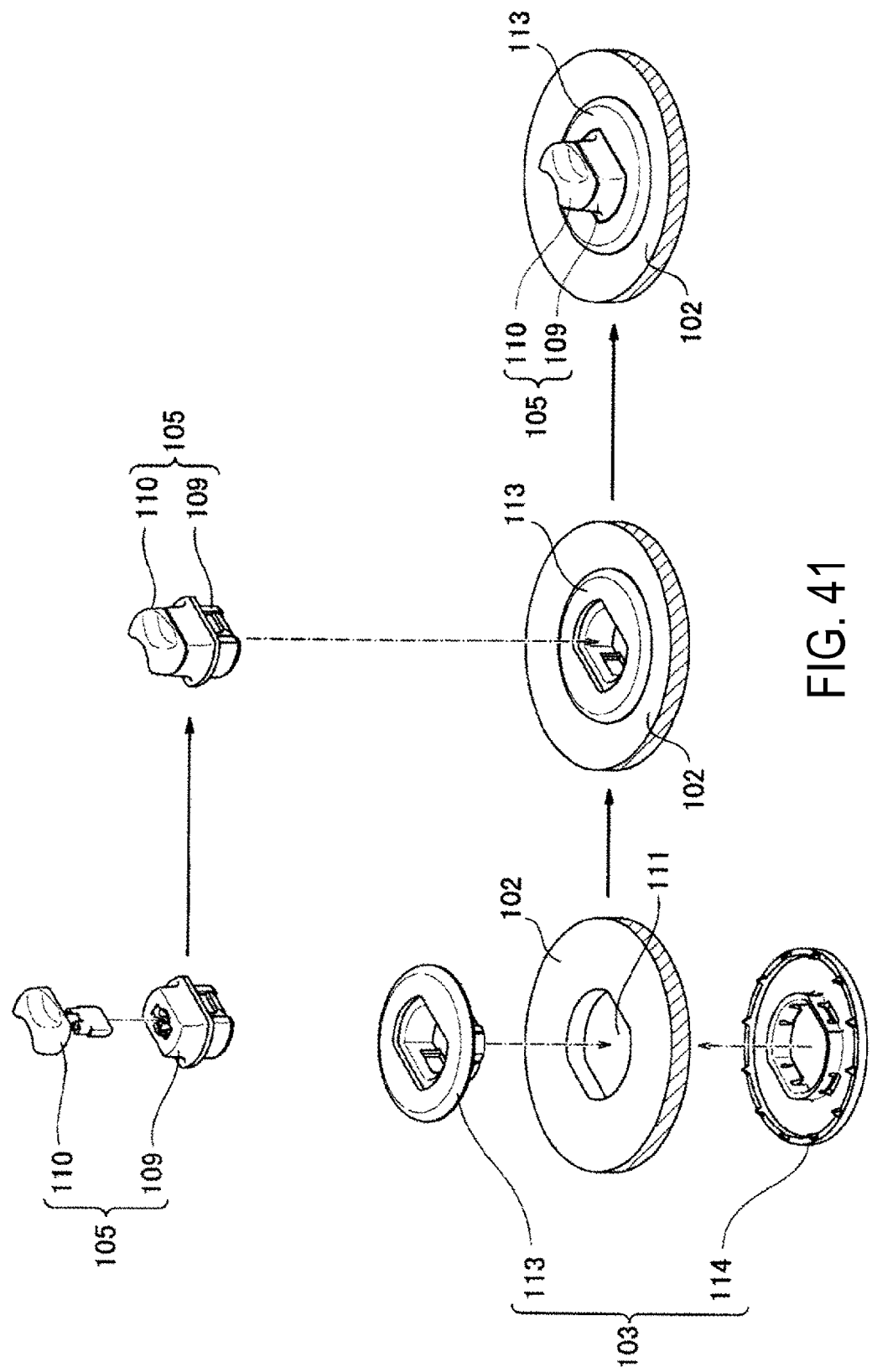

FIG. 41 is a diagram of the operation of combining a first fastener and a knob assembly of a fastening assembly to a carpet in accordance with a second embodiment of the present invention.

Figure 42:
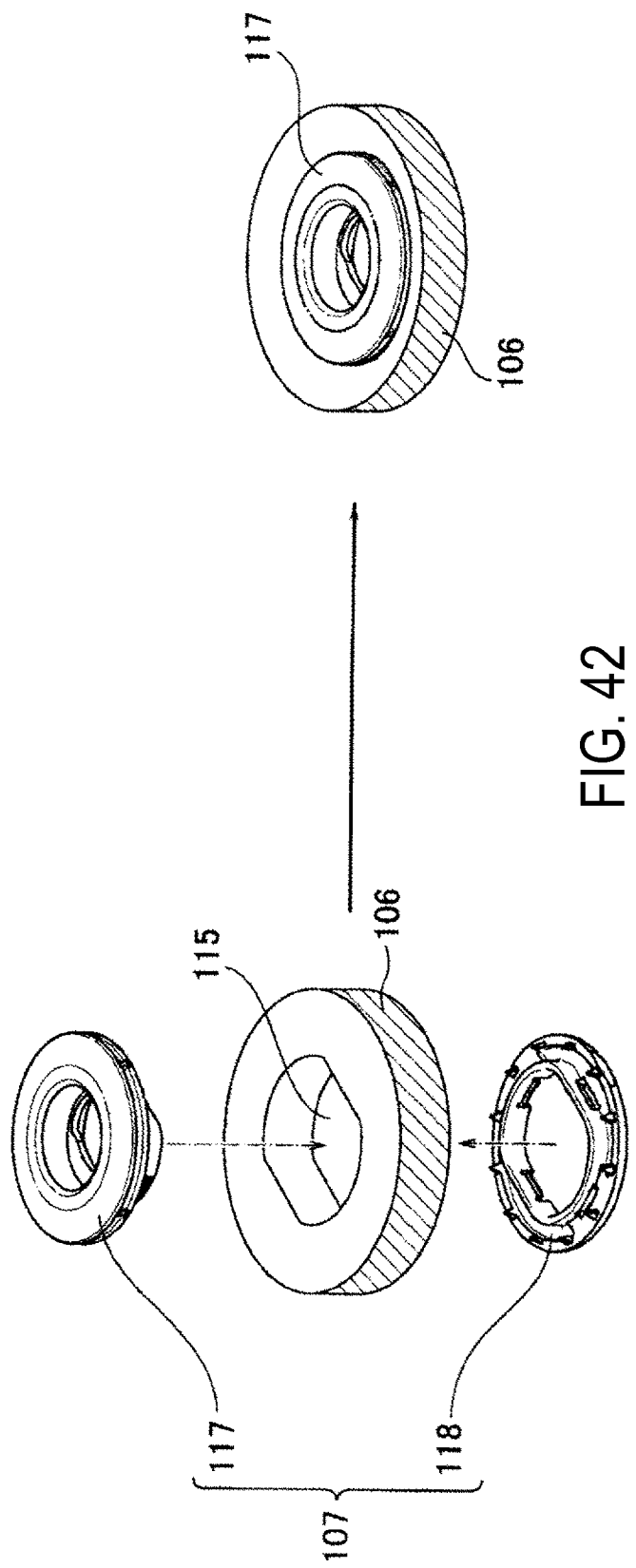

FIG. 42 is a diagram of the operation of combining a second fastener to a floor mat of the second embodiment of the present invention.

Figure 43:
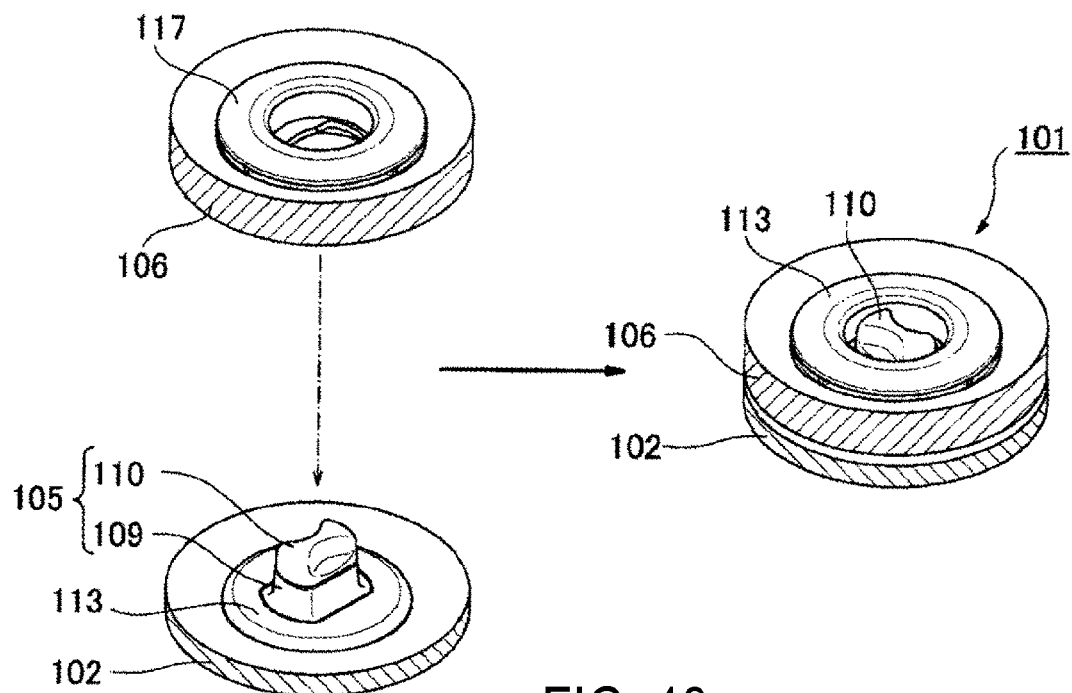

FIG. 43 is a diagram of the operation of securing a floor mat to a carpet using the fastening assembly in accordance with the second embodiment of the present invention.

Figure 44:
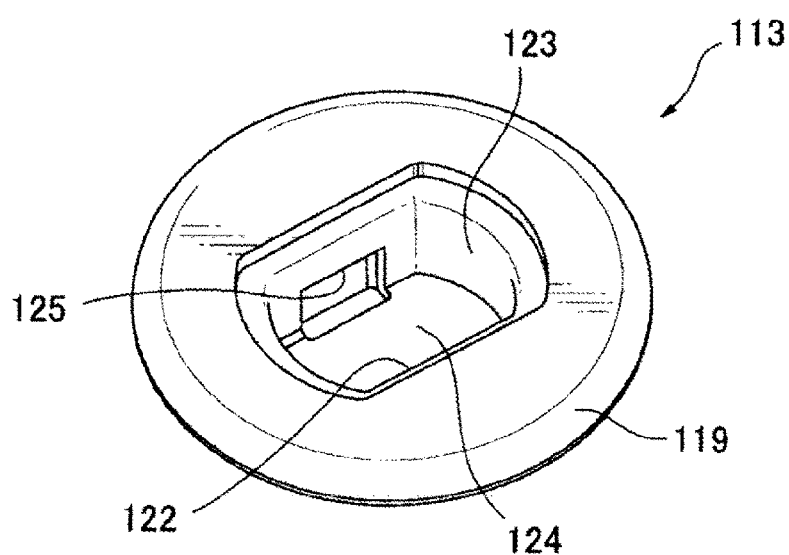

FIG. 44 is a diagonal view of a first carpet grommet of the first fastener of the fastening assembly in accordance with the second embodiment of the present invention.

Figure 45:
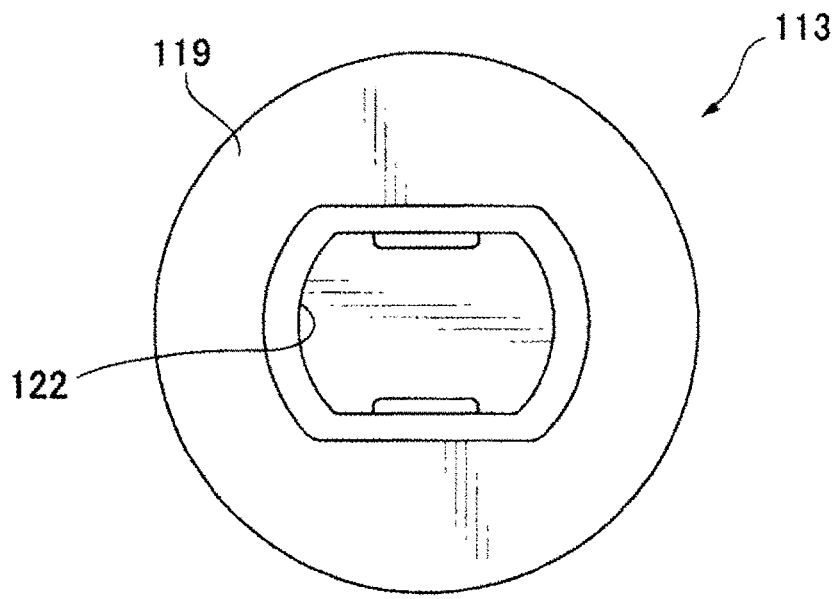

FIG. 45 is a plan of the first carpet grommet illustrated in FIG. 44.

Figure 46:
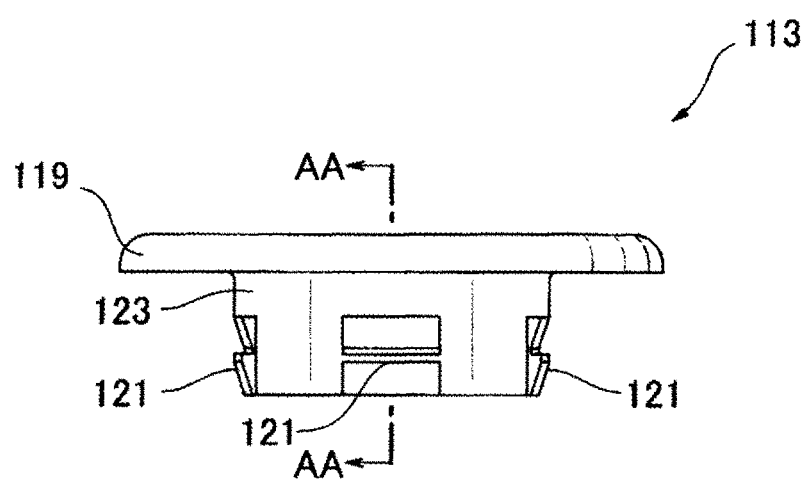

FIG. 46 is a front elevation of the first carpet grommet illustrated in FIG. 45.

Figure 47:
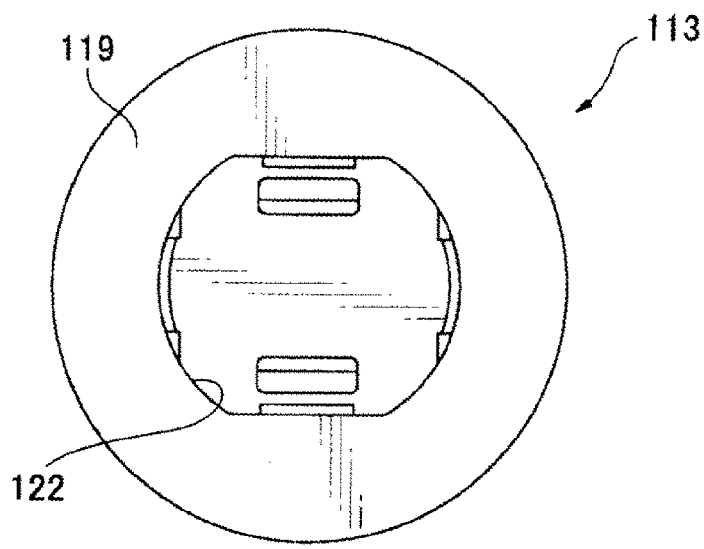

FIG. 47 is a bottom view of the first carpet grommet illustrated in FIG. 46.

Figure 48:
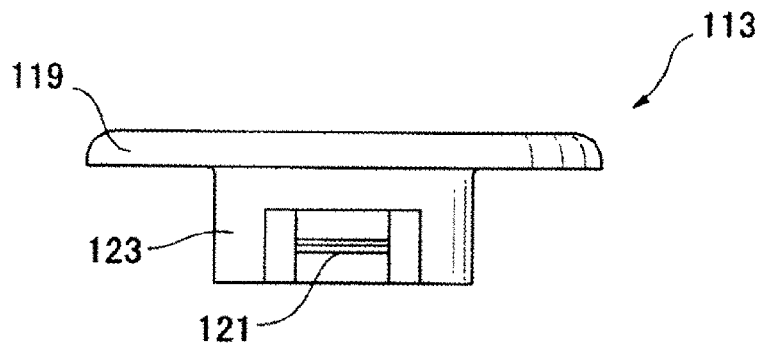

FIG. 48 is a right side elevation of the first carpet grommet illustrated in FIG. 46.

Figure 49:
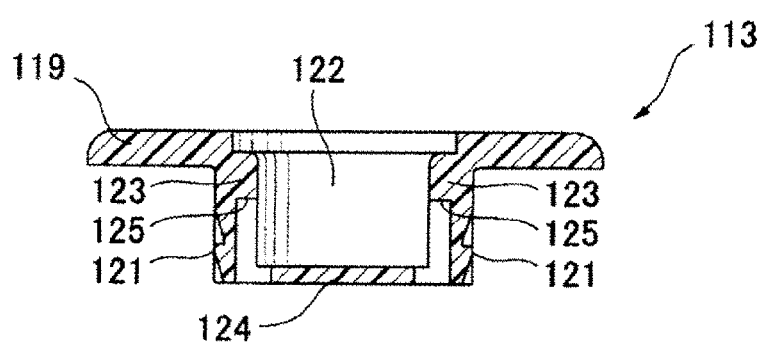

FIG. 49 is a section at the AA-AA line of the first carpet grommet illustrated in FIG. 46.

Figure 50:
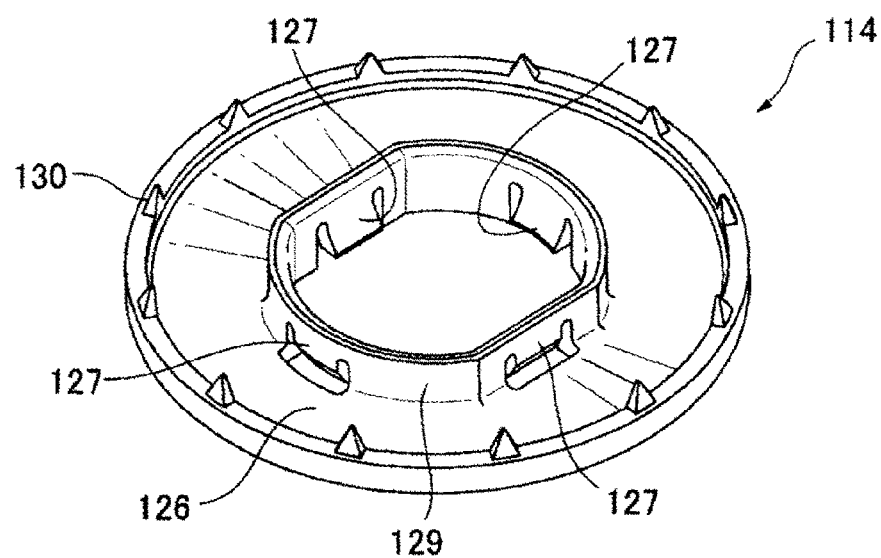

FIG. 50 is a diagonal view of a second carpet grommet of the first fastener of the fastening assembly in accordance with the second embodiment of the present invention.

Figure 51:
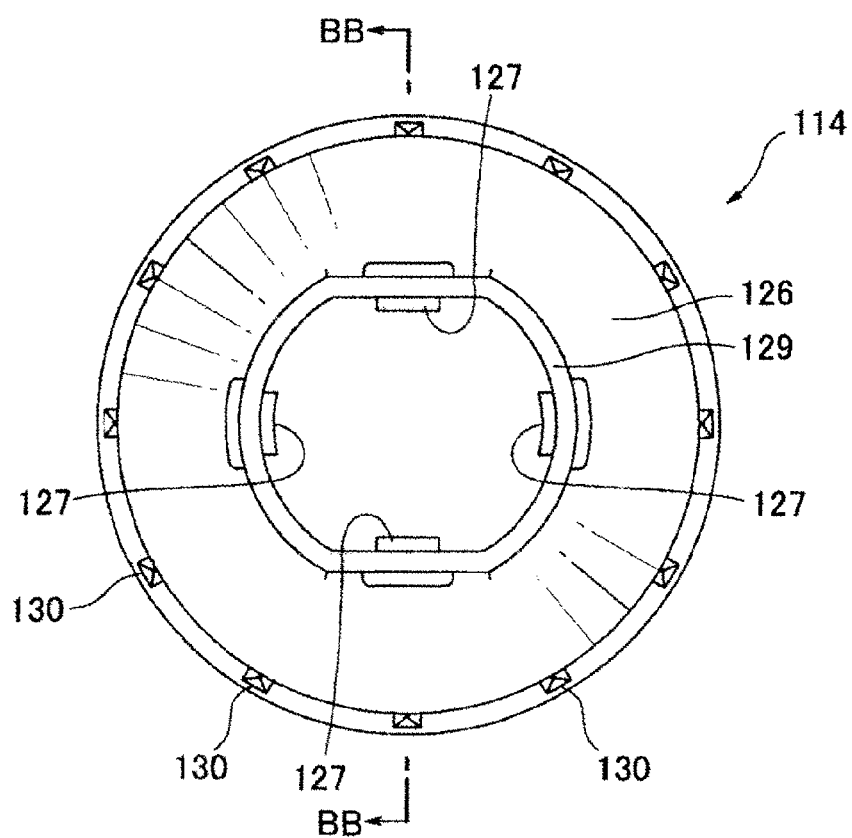

FIG. 51 is a plan of the second carpet grommet illustrated in FIG. 50.

Figure 52:
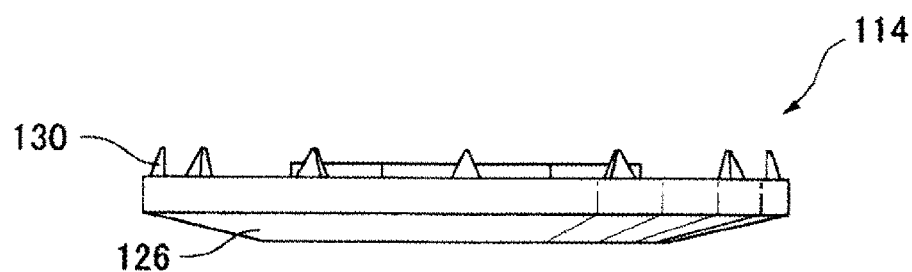

FIG. 52 is front elevation of the second carpet grommet illustrated in FIG. 51.

Figure 53:
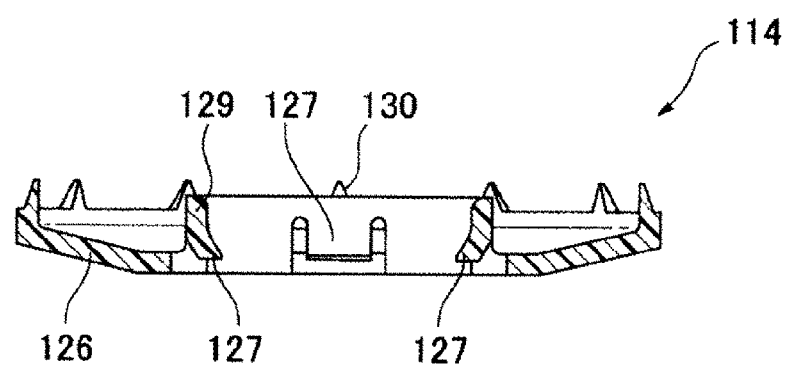

FIG. 53 is a section at the BB-BB line of the second carpet grommet illustrated in FIG. 51.

Figure 54:
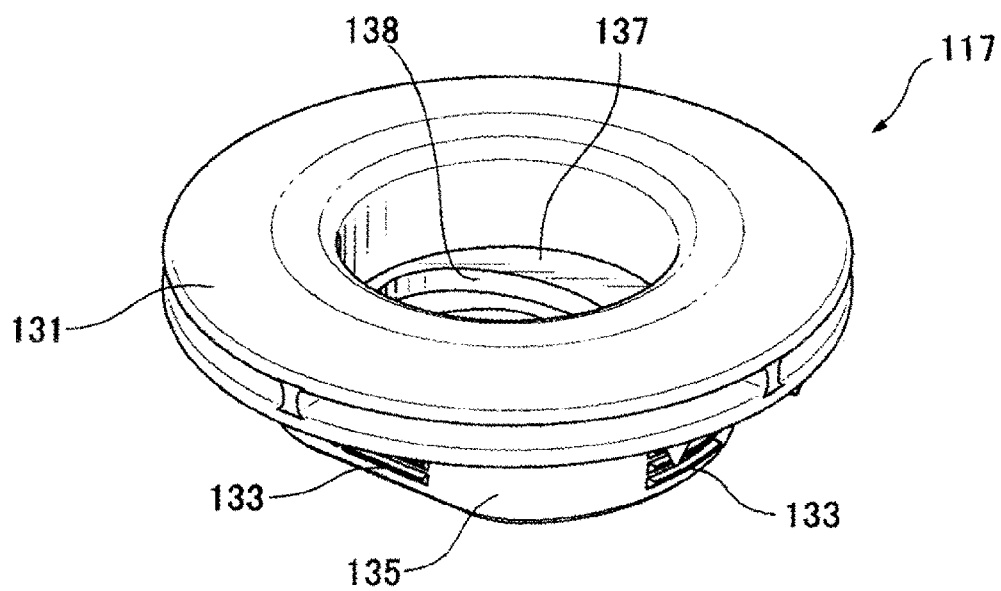

FIG. 54 is a diagonal view of a first mat grommet of a second fastener of the fastening assembly in accordance with the second embodiment of the present invention.

Figure 55:
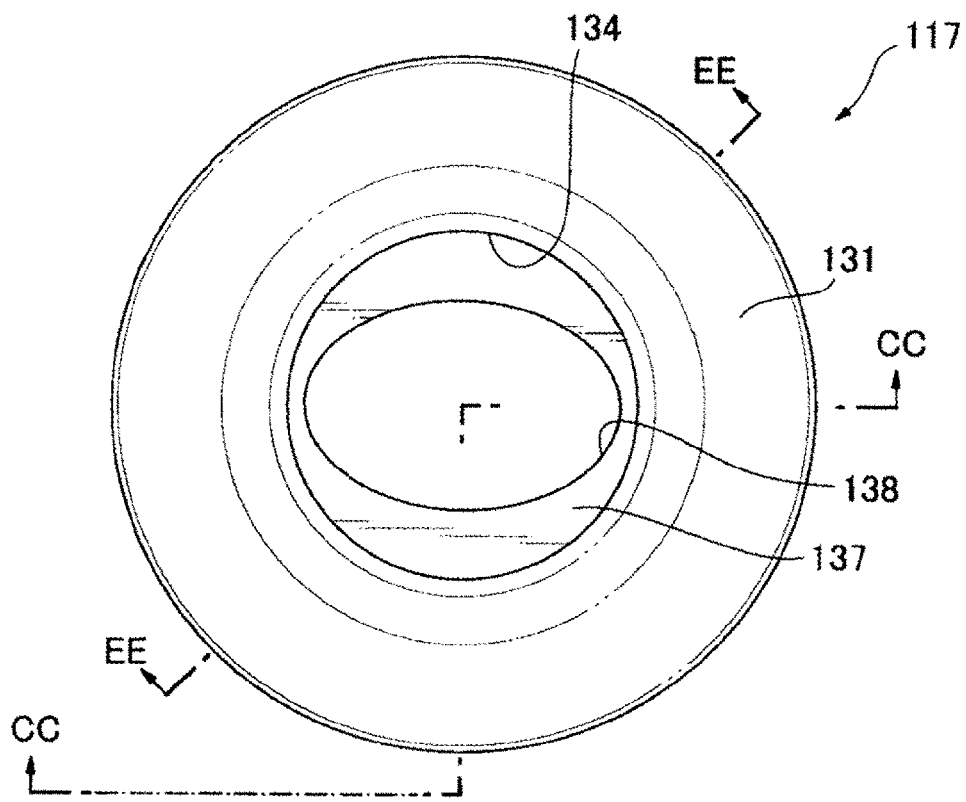

FIG. 55 is a plan of the first mat grommet illustrated in FIG. 54.

Figure 56:
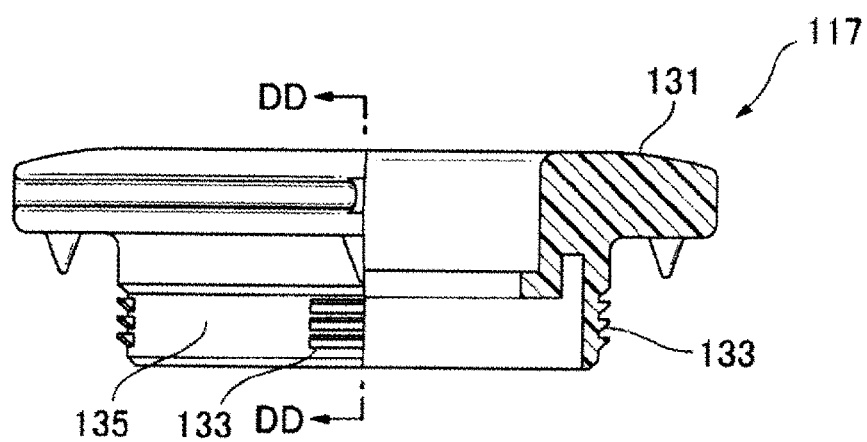

FIG. 56 is a section at the CC-CC line of the first mat grommet illustrated in FIG. 55.

Figure 57:
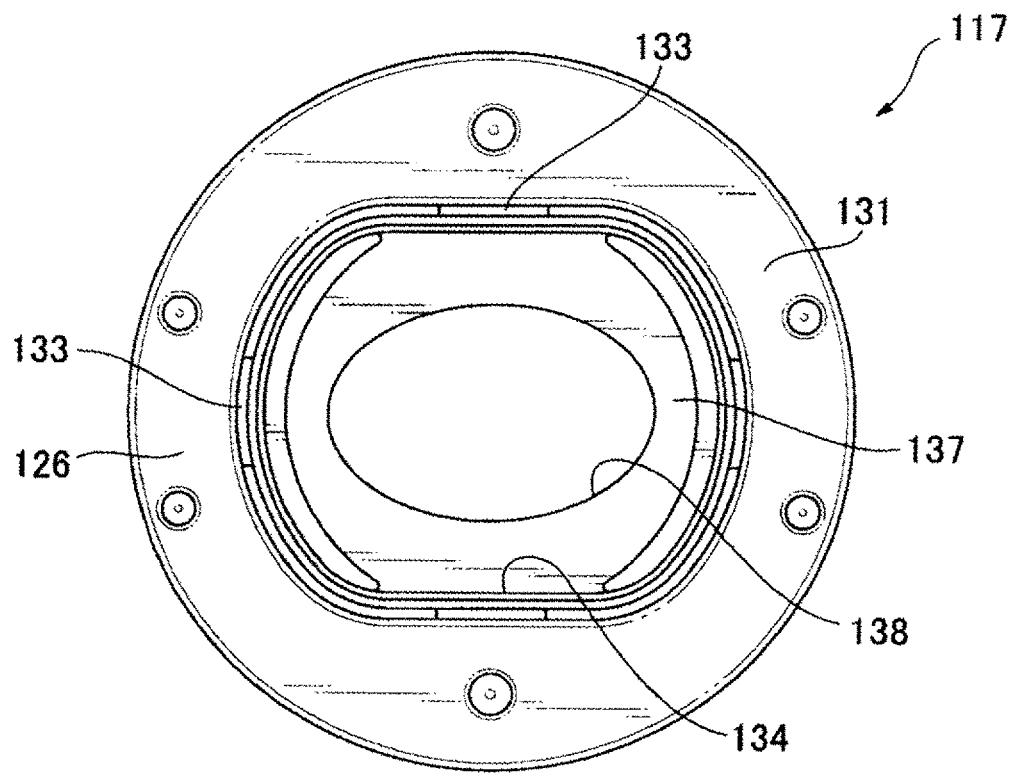

FIG. 57 is a bottom view of the first mat grommet illustrated in FIG. 55.

Figure 58:
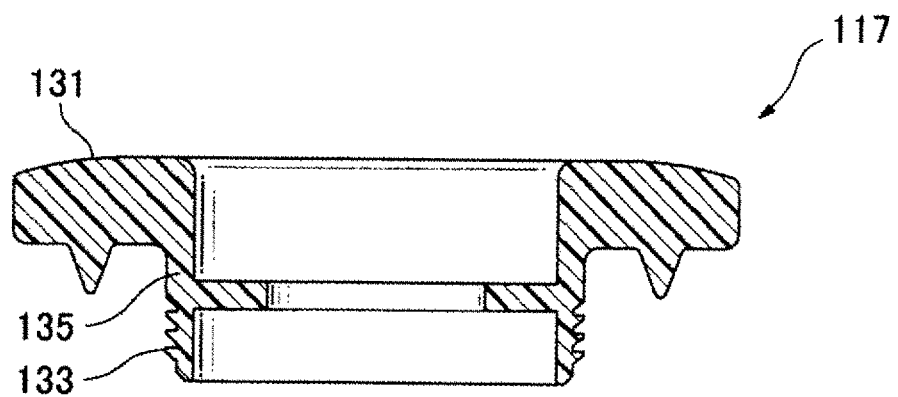

FIG. 58 is a section at the DD-DD line of the first mat grommet illustrated in FIG. 56.

Figure 59:
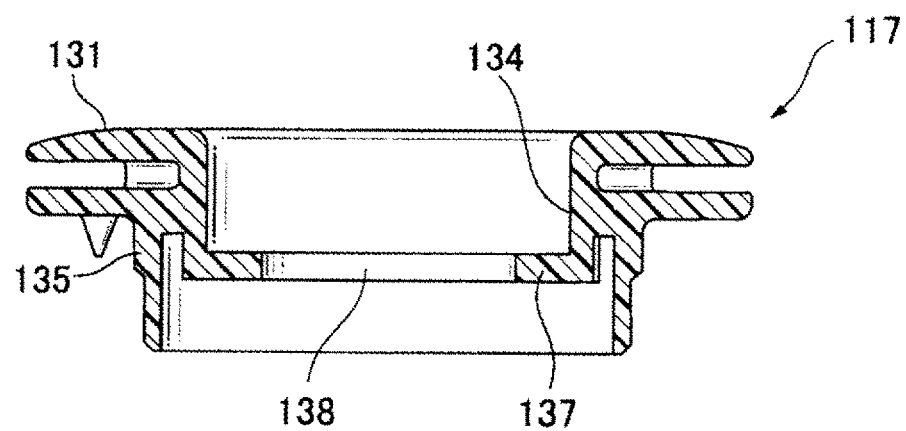

FIG. 59 is a section at the EE-EE line of the first mat grommet illustrated in FIG. 55.

Figure 60:
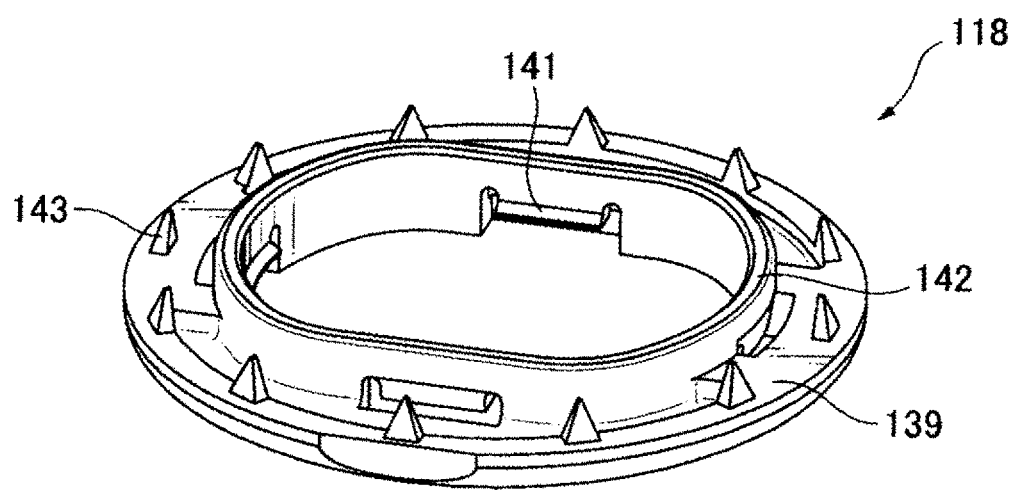

FIG. 60 is a diagonal view of a second mat grommet of a second fastener of the fastening assembly in accordance with the second embodiment of the present invention.

Figure 61:
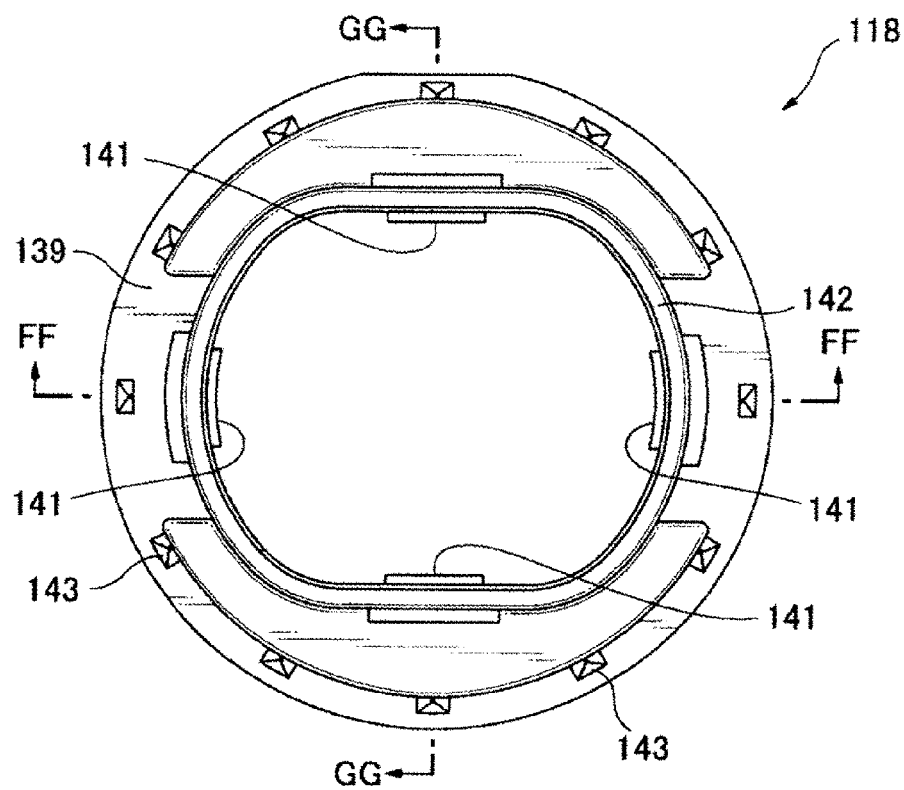

FIG. 61 is a plan of the second mat grommet illustrated in FIG. 60.

Figure 62:
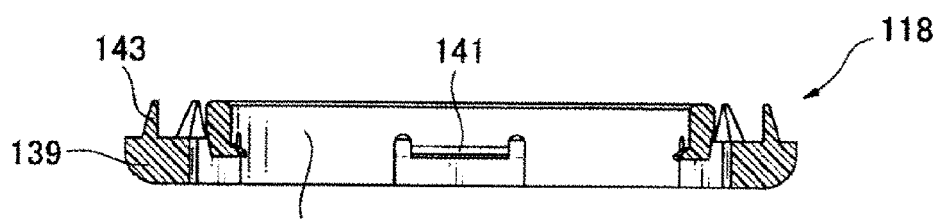

FIG. 62 is a section at the FF-FF line of the second mat grommet illustrated in FIG. 61.

Figure 63:
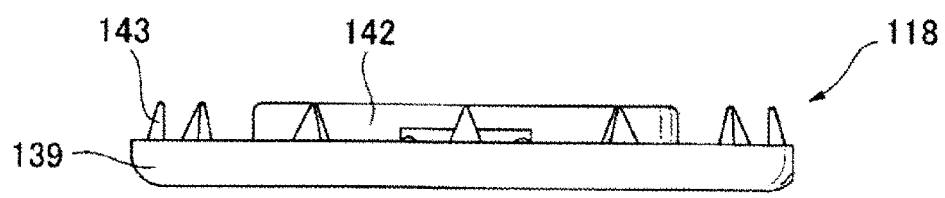

FIG. 63 is a right side elevation of the second mat grommet illustrated in FIG. 61.

Figure 64:
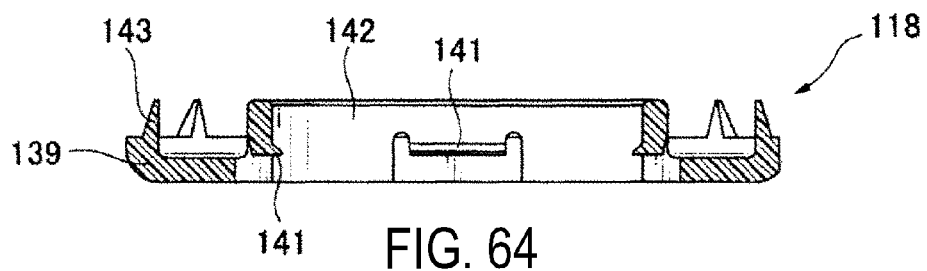

FIG. 64 is a section at the GG-GG line of the second mat grommet illustrated in FIG. 61.

Figure 65:
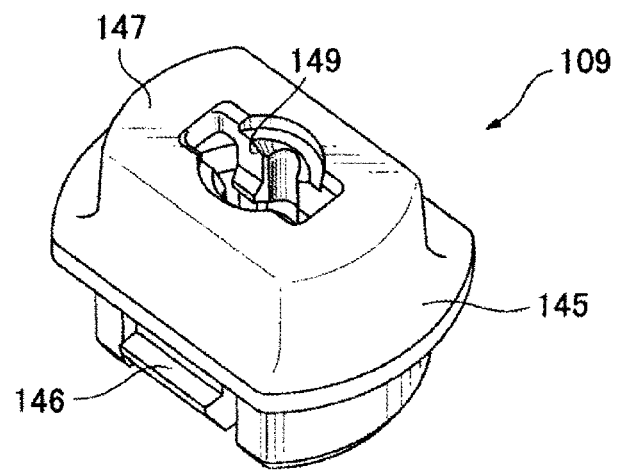

FIG. 65 is a diagonal view of the knob base of a knob assembly of the fastening assembly in accordance with the second embodiment of the present invention.

Figure 66:
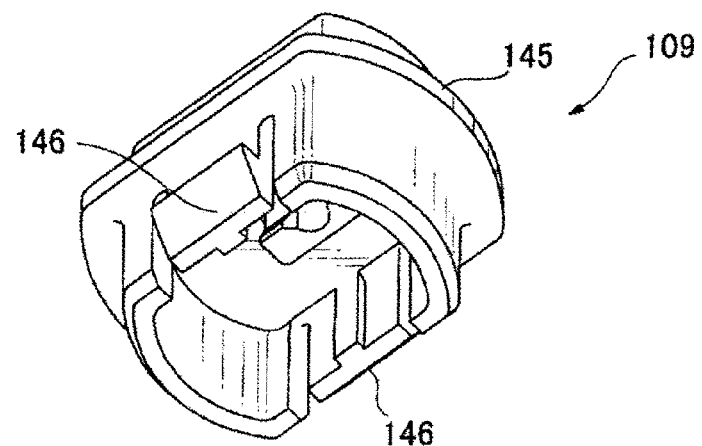

FIG. 66 is a diagonal view of the knob base illustrated in FIG. 65 as seen from the bottom side.

Figure 67:
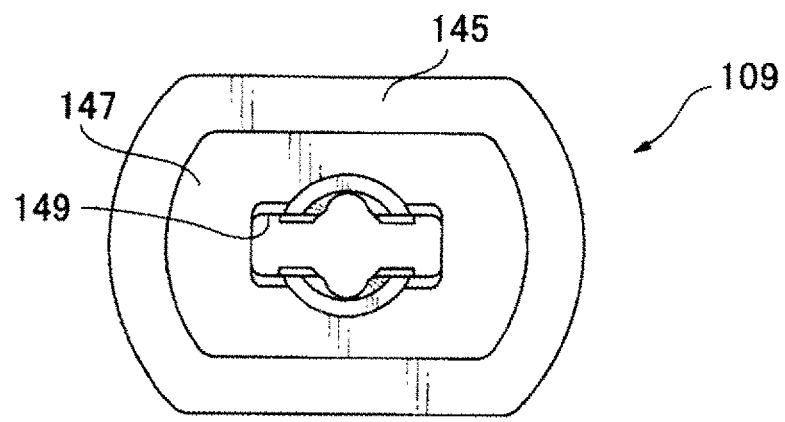

FIG. 67 is a plan of the knob base illustrated in FIG. 65.

Figure 68:
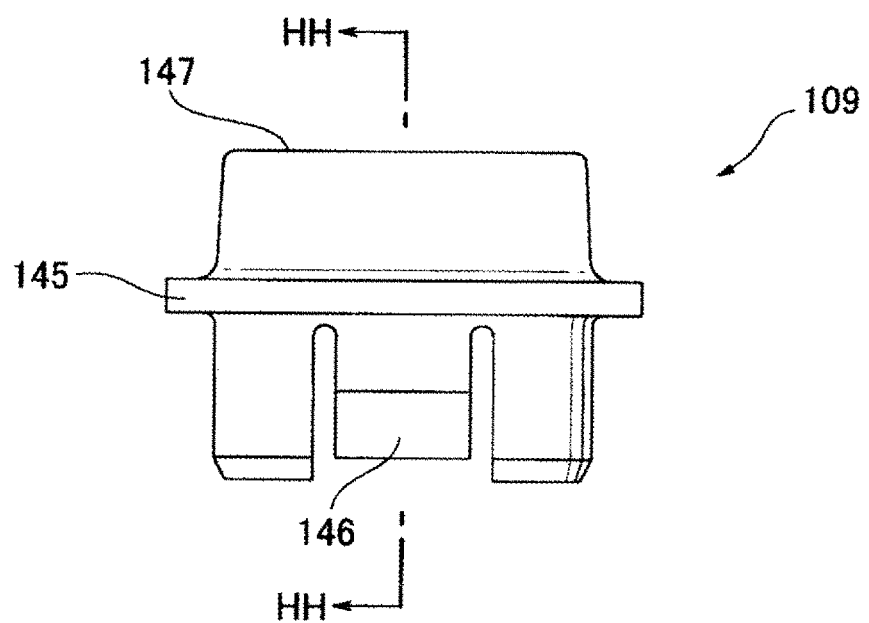

FIG. 68 is a front elevation of the knob base illustrated in FIG. 67.

Figure 69:
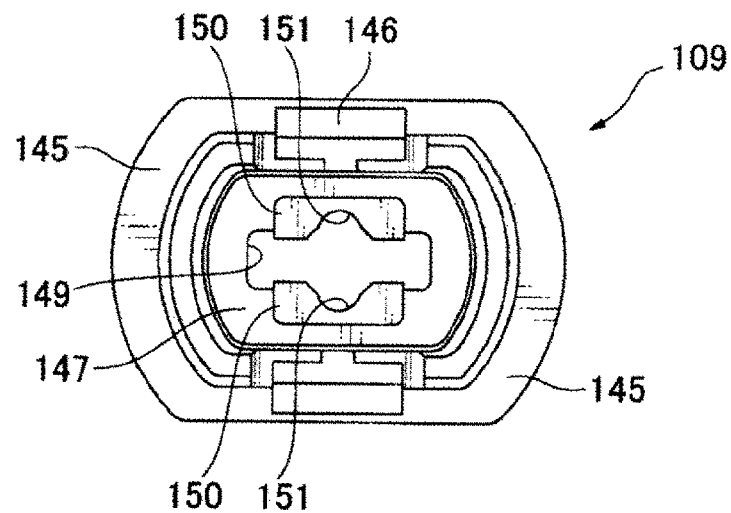

FIG. 69 is a bottom view of the knob base illustrated in FIG. 68.

Figure 70:
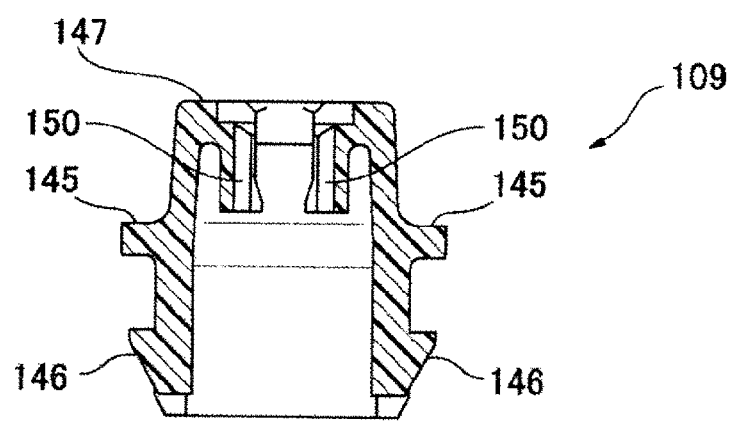

FIG. 70 is a section at the HH-HH line of the knob base illustrated in FIG. 68.

Figure 71:
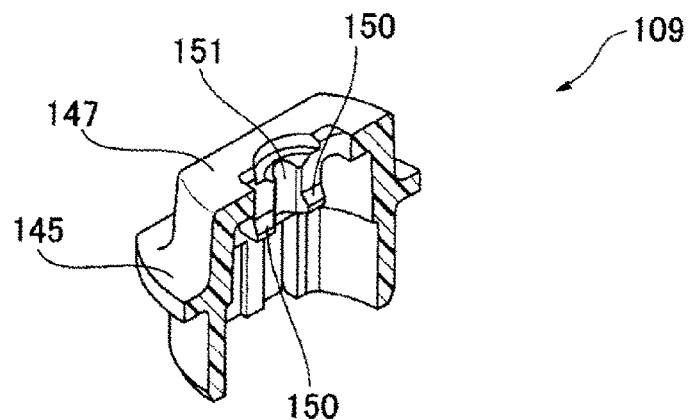

FIG. 71 is a half-sectional diagonal view of the knob base illustrated in FIG. 69.

Figure 72:
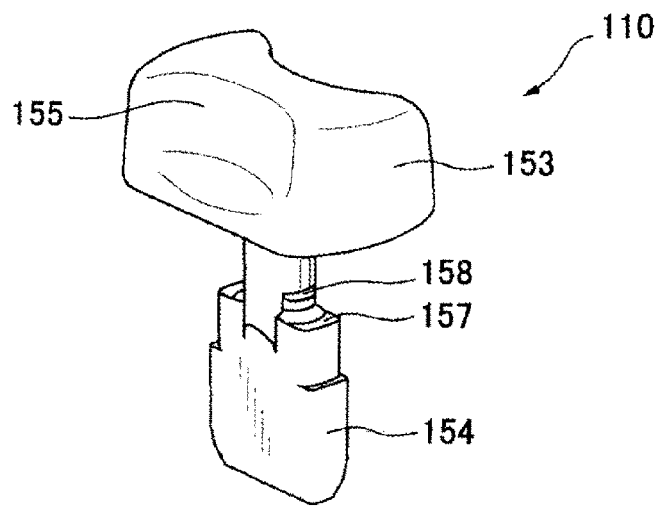

FIG. 72 is a diagonal view of the knob of the knob assembly of the fastening assembly in accordance with the second embodiment of the present invention.

Figure 73:
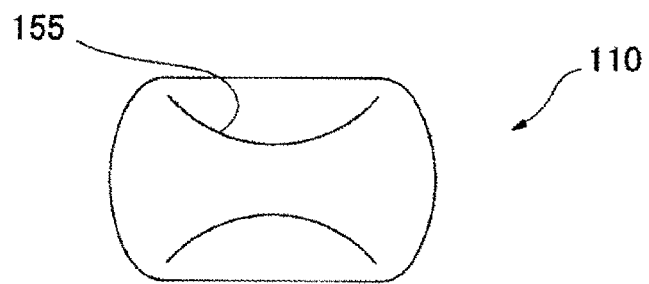

FIG. 73 is a plan of the knob illustrated in FIG. 72.

Figure 74:
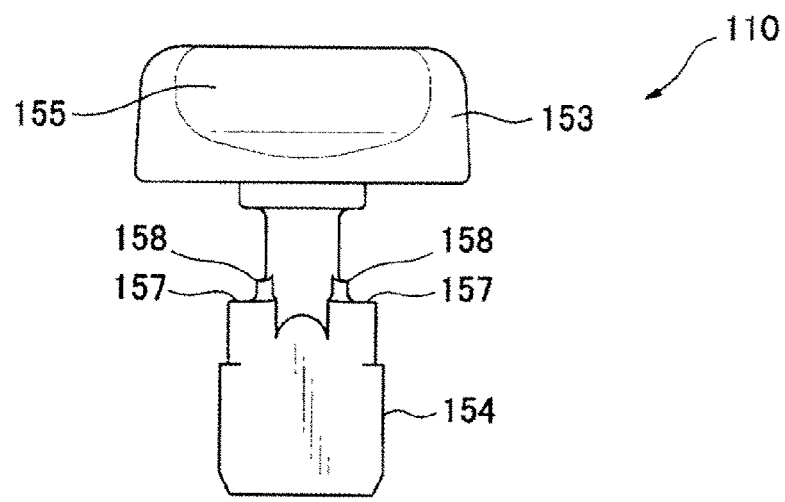

FIG. 74 is a front elevation of the knob illustrated in FIG. 73.

Figure 75:
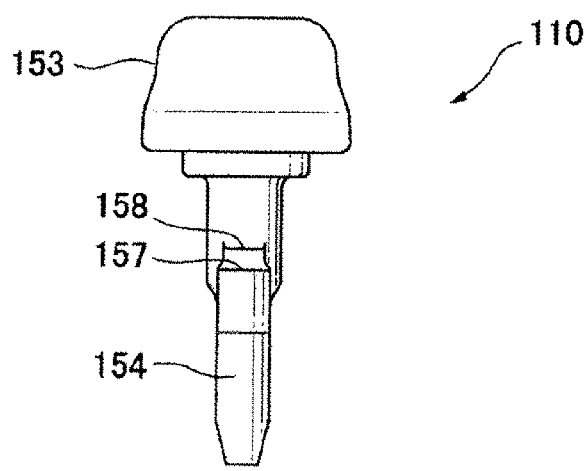

FIG. 75 is a right side elevation of the knob illustrated in FIG. 74.

Figure 76:
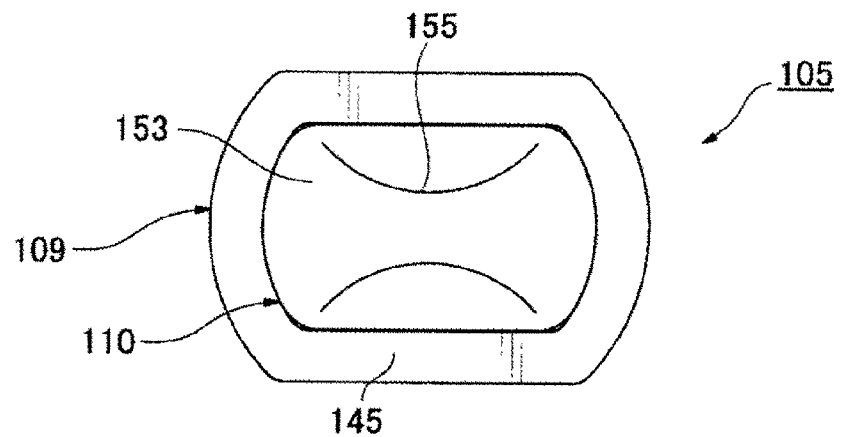

FIG. 76 is a plan of the knob assembly of the fastening assembly in accordance with the second embodiment of the present invention.

Figure 77:
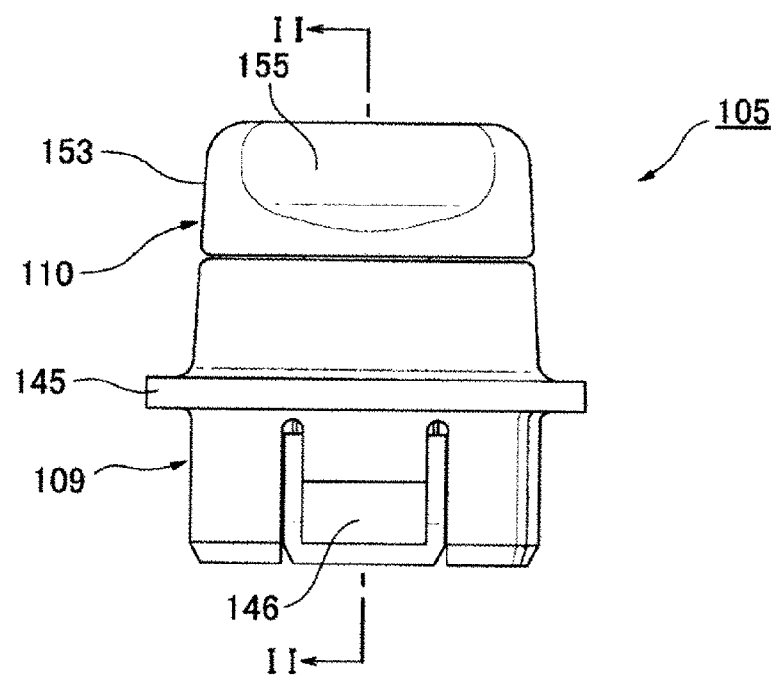

FIG. 77 is a front elevation of the knob assembly illustrated in FIG. 76.

Figure 78:
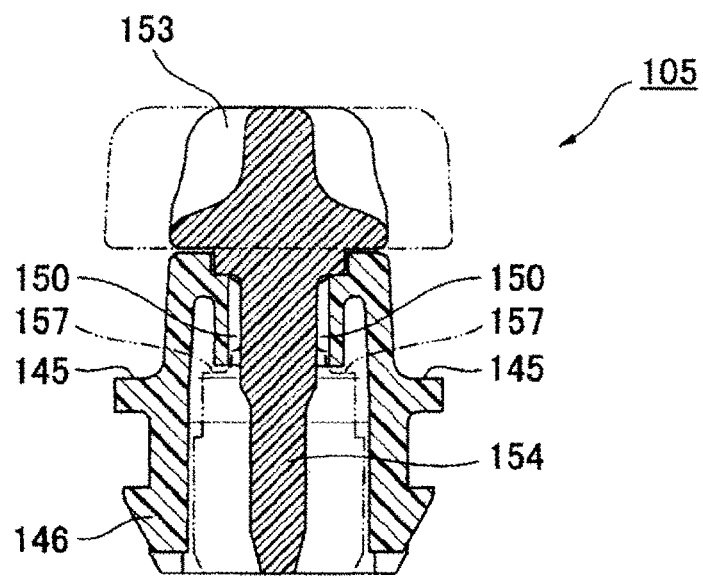

FIG. 78 is a section at the II-II line of the knob assembly illustrated in FIG. 77.

Figure 79:
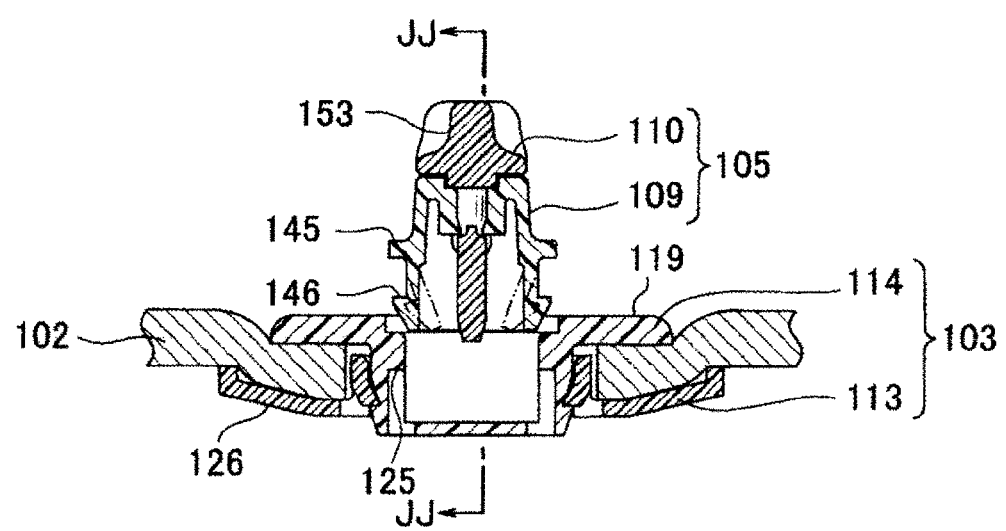

FIG. 79 is a section representing the operation of combining a knob assembly when the first fastener of the fastening assembly has been attached to a carpet in accordance with the second embodiment of the present invention.

Figure 80:
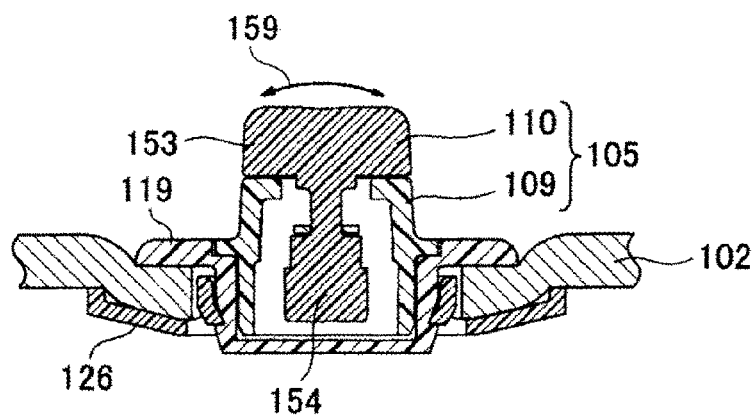

FIG. 80 is a section at the JJ-JJ line representing the state after the knob assembly illustrated in FIG. 79 has been coupled to the first fastener.

Figure 81:
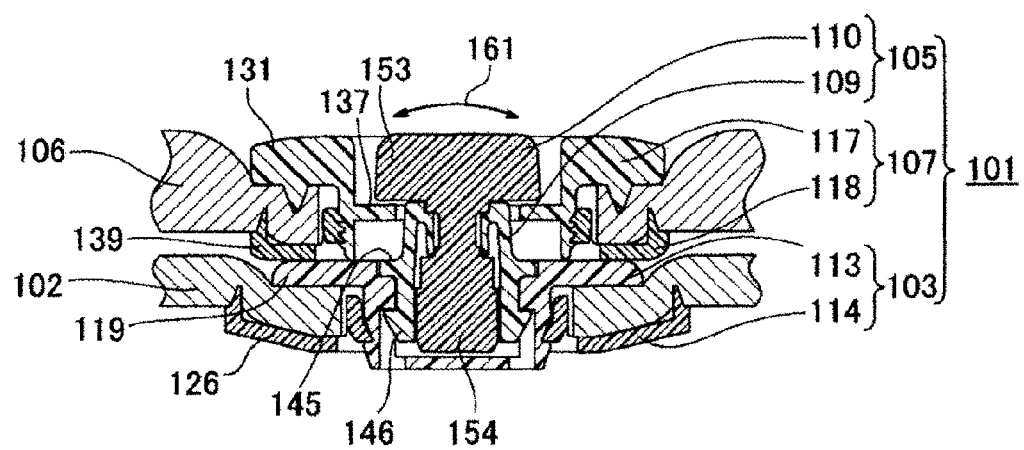

FIG. 81 is a section showing the manner in which a floor mat is secured to a carpet using the fastening assembly in accordance with the second embodiment of the present invention.

Figure 82:
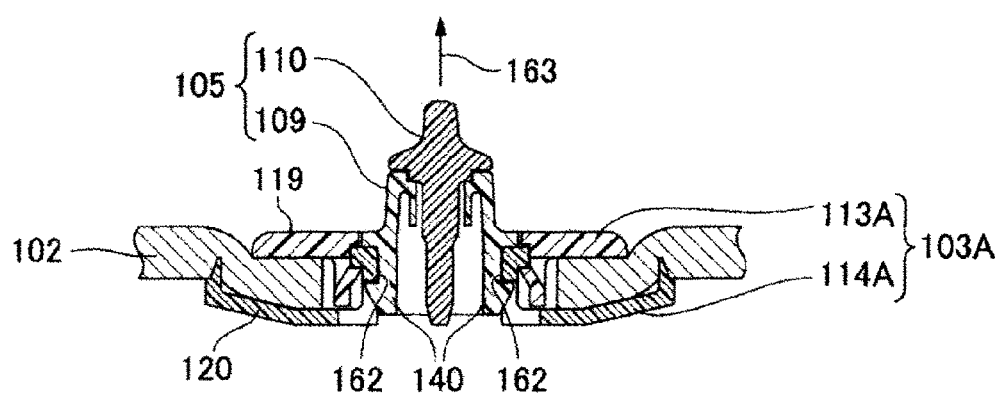

FIG. 82 is a section representing the relationship between a first fastener and a knob assembly of a fastening assembly in accordance with another embodiment of the present invention.

Figure 83:
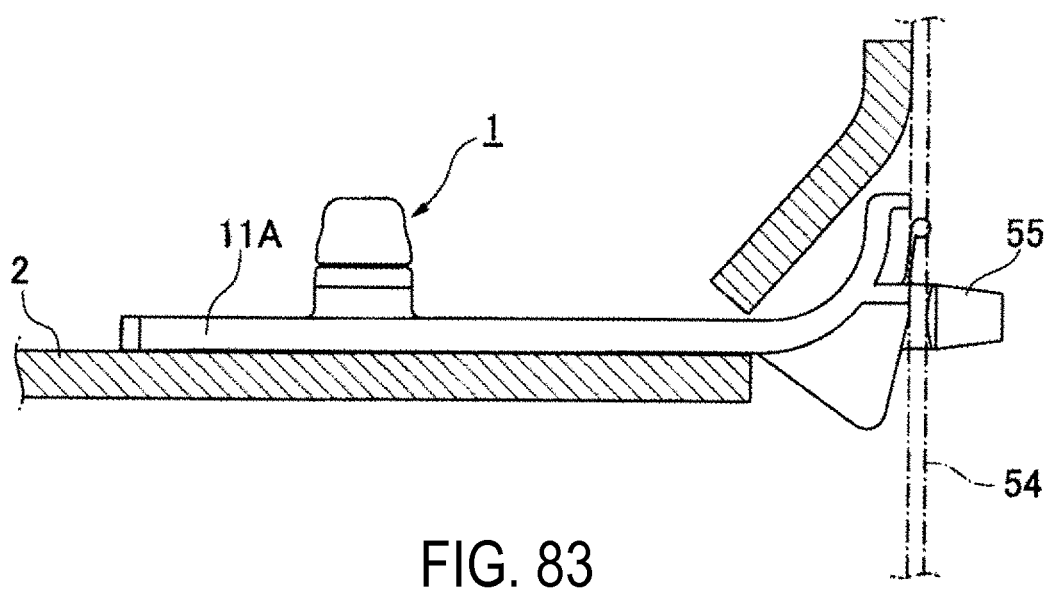

FIG. 83 is a section representing a secured state realized by a fastening assembly in accordance with the present invention when the fastening assembly has a configuration whereby a floor mat attached to a carpet is then attached to a body panel.

DETAILED DESCRIPTION OF THE INVENTION

A fastening assembly 1 for securing a floor mat to a carpet shall now be described with reference to the drawings in accordance with an embodiment of the present invention. In FIGS. 1 to 40, a fastening assembly 1 is shown in accordance with a first embodiment of the present invention, and in FIGS. 41 to 81, a fastening assembly 101 is shown in accordance with a second embodiment of the present invention. In FIG. 82, a modified embodiment of the fastening assembly is shown in accordance with the second embodiment. In FIG. 83, a modified example of a floor mat is illustrated.

Figure 1:
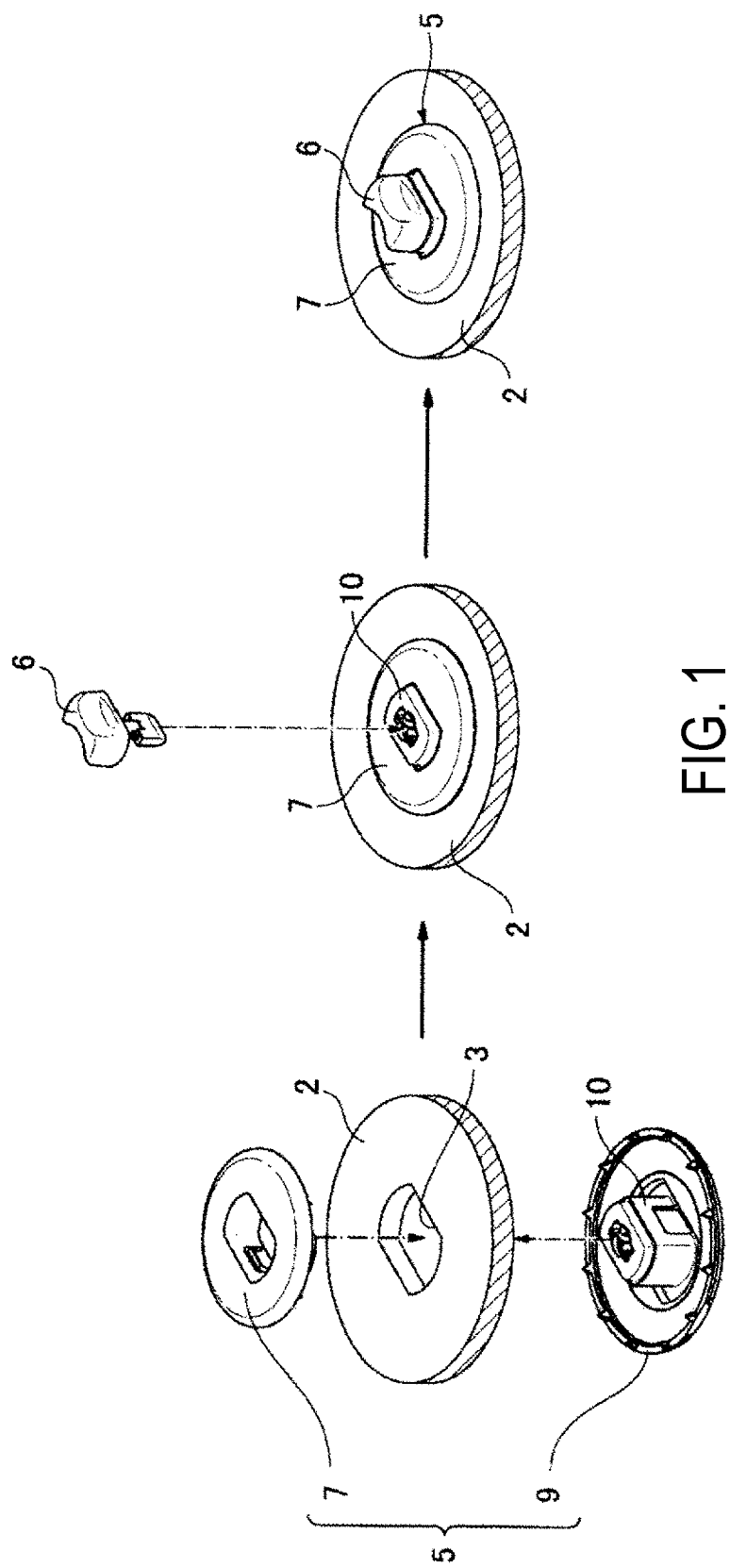
FIG. 1 is a diagram of the operation of combining the first fastener and knob of a fastening assembly to a carpet in accordance with a first embodiment of the present invention.
Figure 2:
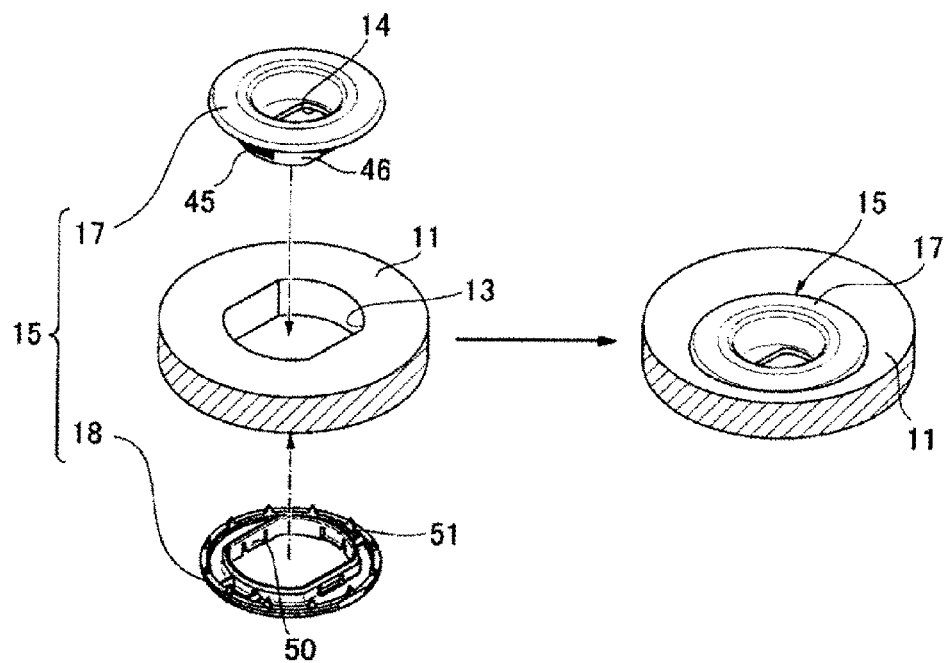
FIG. 2 is a diagram of the operation of combining a second fastener to a floor mat in accordance with the first embodiment of the present invention.
Figure 3:
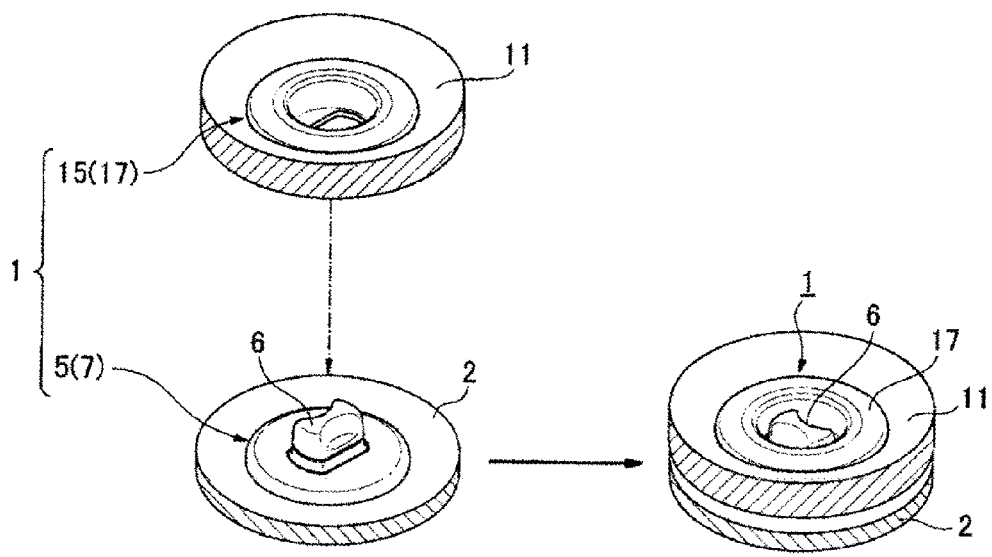
FIG. 3 is a diagram of the operation of using the fastening assembly to secure a floor mat to a carpet in accordance with the first embodiment of the present invention.
Figure 4:
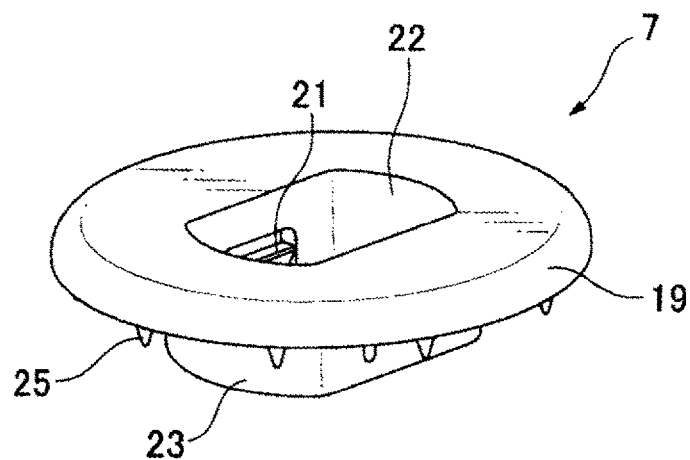
FIG. 4 is a diagonal view of a first carpet grommet of the first fastener of the fastening assembly, in accordance with the first embodiment of the present invention.
Figure 5:
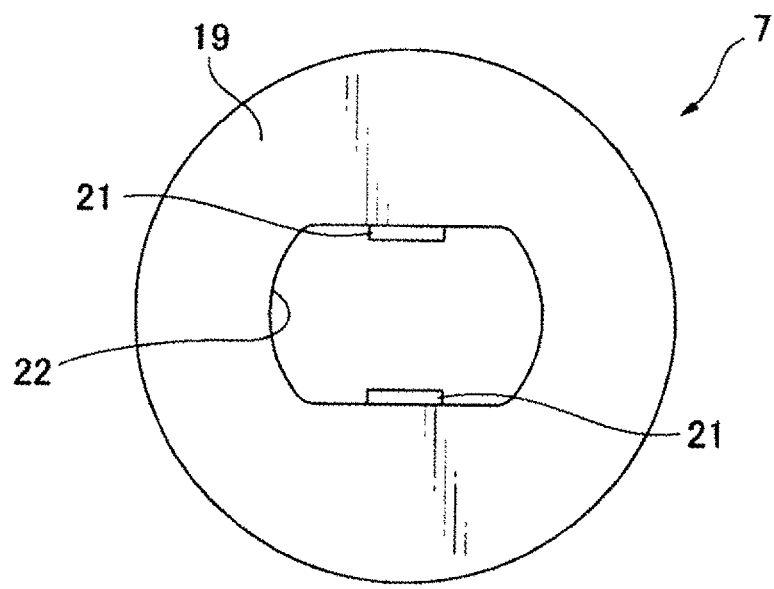
FIG. 5 is a plan of the first carpet grommet illustrated in FIG. 4.
Figure 6:
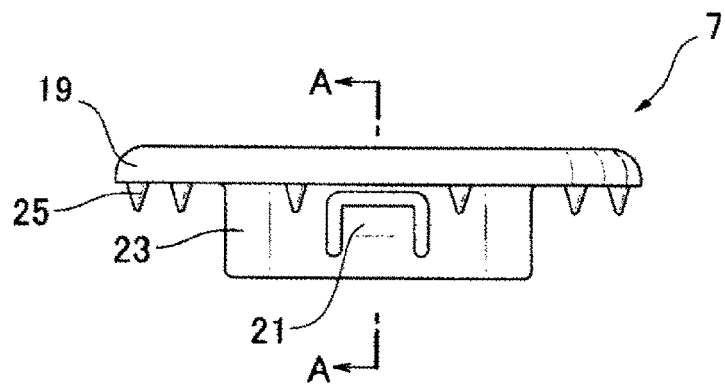
FIG. 6 is a front elevation of the first carpet grommet illustrated in FIG. 4.
Figure 7:
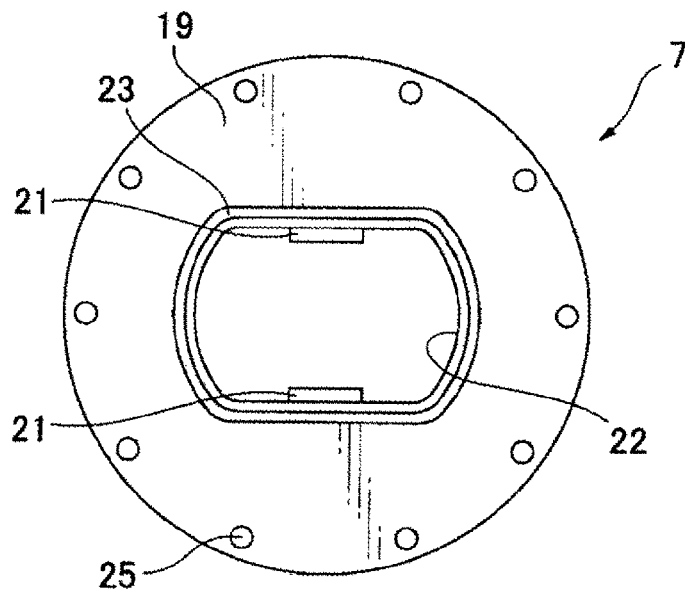
FIG. 7 is a bottom view of the first carpet grommet illustrated in FIG. 4.
Figure 8:
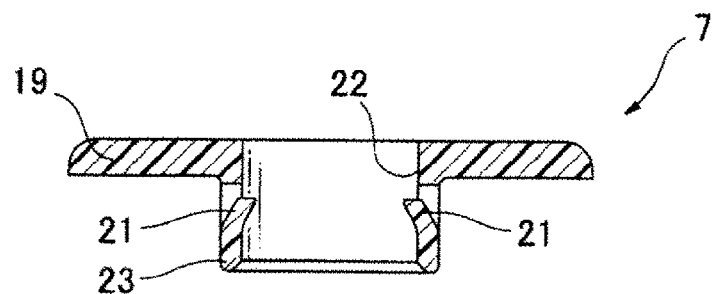
FIG. 8 is a section at the A-A line of the first carpet grommet illustrated in FIG. 6.
Figure 9:
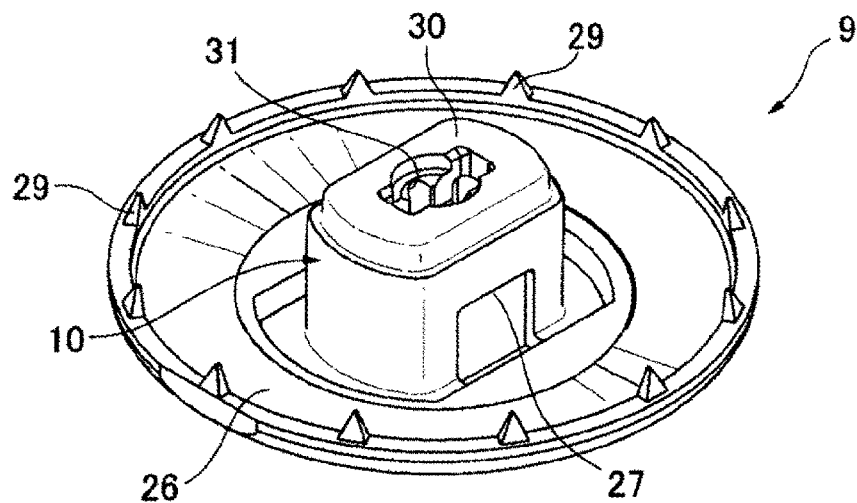
FIG. 9 is a diagonal view of a second carpet grommet of the first fastener of the fastening assembly in accordance with the first embodiment of the present invention.
Figure 10:
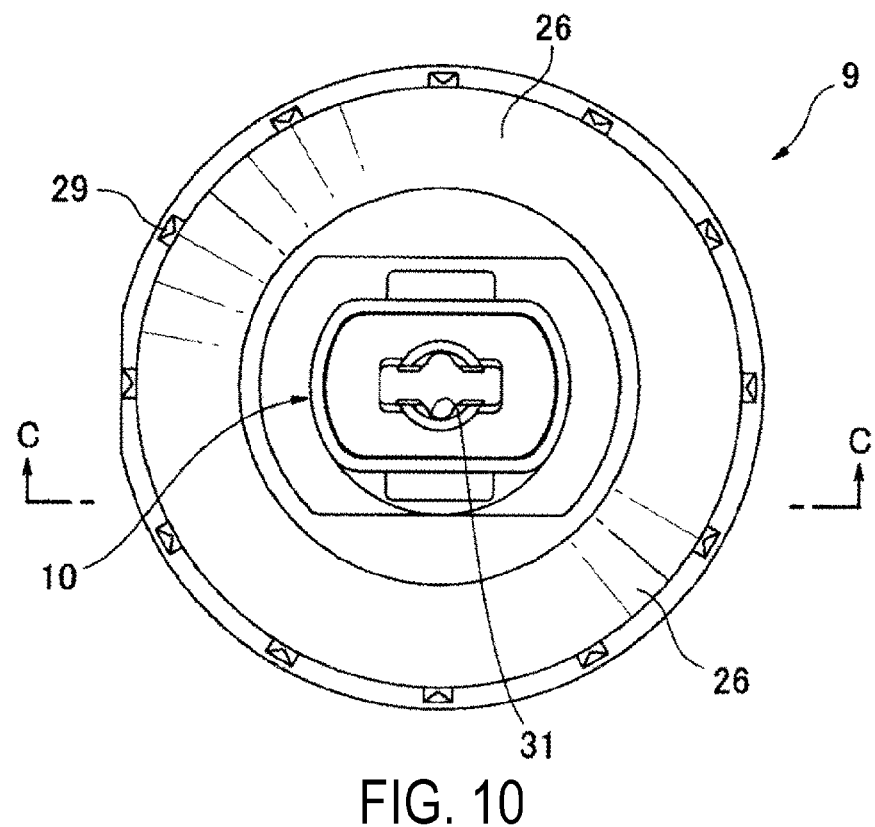
FIG. 10 is a plan of the second carpet grommet illustrated in FIG. 9.
Figure 11:
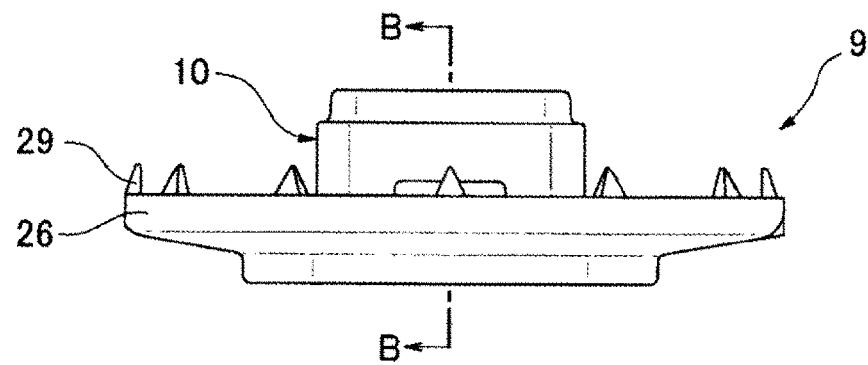
FIG. 11 is a front elevation of the second carpet grommet illustrated in FIG. 10.
Figure 12:
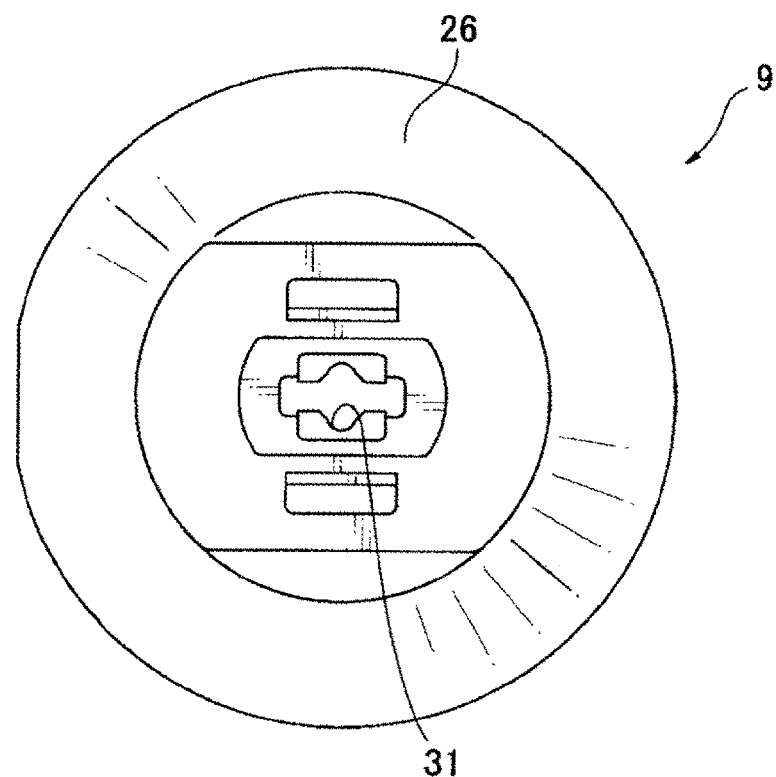
FIG. 12 is a bottom view of the second carpet grommet illustrated in FIG. 11.
Figure 13:
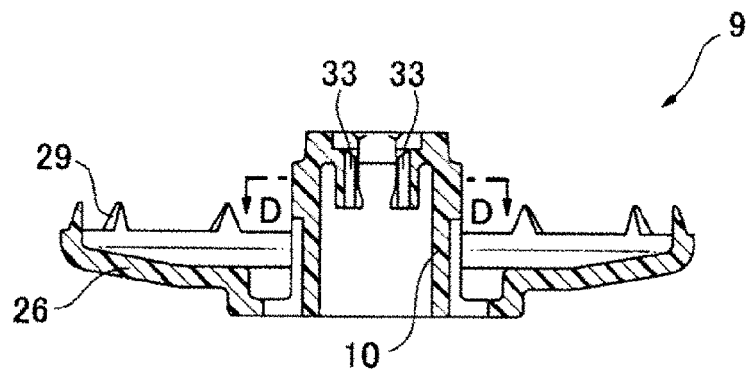
FIG. 13 is a section at the B-B line of the second carpet grommet illustrated in FIG. 11.
Figure 14:
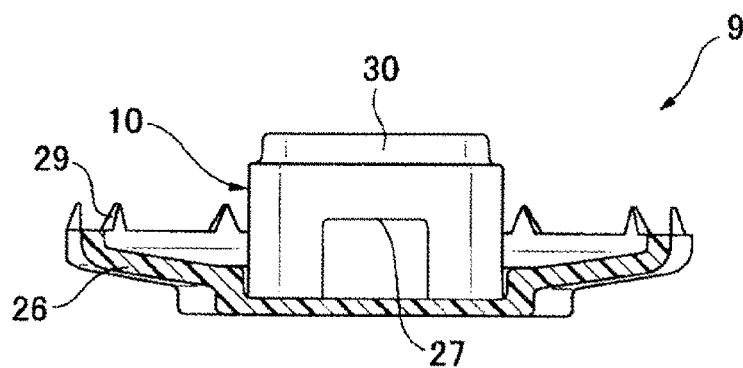
FIG. 14 is a section at the C-C line of the second grommet illustrated in FIG. 10.

The fastening assembly 1 in accordance with the first embodiment of the present invention shall now be described with reference to FIGS. 1 to 40. FIGS. 1 to 3 show the manner in which the fastening assembly 1, comprising a plurality of components, appears when used. A simple description shall now be given of the configuration of the fastening assembly 1 with reference to FIGS. 1 to 3. FIG. 1 shows a first fastener 5 attached to an attachment hole 3 in a carpet 2 in order to reinforce the peripheral portion of the attachment hole 3, and a knob 6 attached to the first fastener 5 by pushing it into the first fastener 5 (i.e., into the knob base of the second carpet grommet thereof). The first fastener 5 comprises two components, namely, a first carpet grommet 7 and a second carpet grommet 9. In the second carpet grommet 9, a knob base 10 to which the knob 6 is coupled is integrally molded. These components, namely the knob 6, first carpet grommet 7 and second carpet grommet 9 (including the knob base 10), are formed of a plastic material. FIG. 2 diagrams a second fastener 15 which is attached to an attachment hole 13 in a floor mat 11 to reinforce the peripheral portion of the attachment hole and which has a through hole 14 in its center. The second fastener 15 comprises two components, namely, a first mat grommet 17 and a second mat grommet 18. These components, namely the first mat grommet 17 and the second mat grommet 18, respectively, are integrally molded of a plastic material. FIG. 3 shows the manner in which the floor mat 11 is secured to the carpet 2 by the combination of the knob 6 and first fastener 5 attached to the carpet 2, as shown in FIG. 1, and the second fastener 15 attached to the floor mat 11, as shown in FIG. 2. For convenience, the carpet 2 and floor mat 11 are represented in the drawings as circular plate-shaped members, but the actual shapes thereof, in most cases, will not be the shapes indicated in FIGS. 1 to 3. It should be understood that the carpet 2, for example, will be in a sheet form that spreads over an automobile floor panel, while the floor mat 11 will be formed in a prescribed sheet form on which the vehicle occupant will place his or her feet.

In FIG. 1, the knob 6 is inserted into a through hole in the knob base 10 formed integrally in the second carpet grommet 9 of the first fastener 5 that is configured by the first carpet grommet 7 and the second carpet grommet 9 and coupled to the first fastener. The first fastener 5 clamps the peripheral portion of the attachment hole 3 of the carpet 2 from the two sides of the carpet 2, that is, from its front surface and back surface, by the first carpet grommet 7 and the second carpet grommet 9. In the example shown, the first carpet grommet 7 is disposed at the front surface of the carpet 2, and the second carpet grommet 9 is disposed at the back surface of the carpet. The first carpet grommet 7 and the second carpet grommet 9 each have a flange that abuts against the peripheral portion of the attachment hole 3 of the carpet 2 and latching means capable of mutually coupling with the carpet 2 in a clamped state. In FIG. 2, the second fastener 15 comprises the first mat grommet 17 and the second mat grommet 18 which clamp the peripheral portion of the attachment hole 13 of the floor mat 11 from both sides. The first mat grommet 17 and second mat grommet 18, respectively, have a flange abutting against the peripheral portion of the attachment hole of the floor mat and latching means capable of coupling with the floor mat 11 in a clamped state. In the example shown, the first mat grommet 17 is disposed on the front surface of the floor mat 11, and the second mat grommet 18 is disposed on the back surface of the floor mat 11, respectively. When coupled to the knob base 10 provided in the second carpet grommet 9 of the first fastener 5, the knob 6 is capable of turning about its axis relative to the knob base 10 in order to assume an unlocked position, shown in FIG. 37, or a locked position, shown in FIG. 38. In the example shown, the knob 6 assumes the locked position by turning 90 degrees about its axis from the unlocked position.

The first fastener 5 shall now be described in detail with reference to FIGS. 4 to 17. In FIGS. 4 to 8, the first carpet grommet 7 of the first fastener 5 is shown. In the first carpet grommet 7, there are a flange 19 that abuts against the peripheral portion of an attachment hole in the carpet 2 and latching parts 21 constituting latching means capable of working together with the second carpet grommet 9 to couple to the second carpet grommet 9 when the carpet 2 is in a clamped state. The latching parts 21 are formed in a pair on the inside surface of tubular part 23 that descends so as to encompass a through hole 22 formed in the flange 19. The latching parts 21 of the tubular part 23 are formed as elastic engagement pawls for latching to latching shoulders on base latching parts 27 of the knob base 10 formed in the second carpet grommet 9. The through hole 22 that extends from the flange 19 to the tubular part 23 is formed either in an oblong shape (an untrue circular shape wherein a true circle is cut by two sides that are in mutual opposition in the direction of its diameter), as illustrated, or in a rectangular shape, being formed in a shape for accepting the knob base 10 having a similarly shaped lateral cross-section. The height of the tubular part 23 is determined so as to match the thickness of the carpet 2 and accept the knob base 10. In the carpet-pressing side of the flange 19, about its peripheral edge, a plurality of sharp points 25 is formed so that the first carpet grommet 7 does not shift on the carpet 2 or turn about its axis.

In FIGS. 9 to 17, the second carpet grommet 9 of the first fastener 5 is illustrated. In the second carpet grommet 9, the knob base 10 for coupling to the knob 6 is formed. Both the knob base 10 and knob 6 will be described in detail subsequently. In the second carpet grommet 9 are a flange 26 that abuts against the peripheral portion of an attachment hole in the carpet 2 and a pair of base latching parts 27 comprising latching shoulders formed in the knob base 10 and constituting latching means capable of working together with the first carpet grommet 7 to couple the carpet, in a clamped state, to latching parts 21 in the first carpet grommet 7. The base latching parts 27 are formed in the tubular shaped knob base 10 which rises from the flange 26 so as to encompass the tubular part 23 of the through hole 14 and latch with the latching parts 21. In the peripheral edge of the flange 26, a plurality of sharp points 29 is formed for sticking into the carpet 2 and preventing the first fastener 5 from shifting or turning about its axis.

Figure 15:
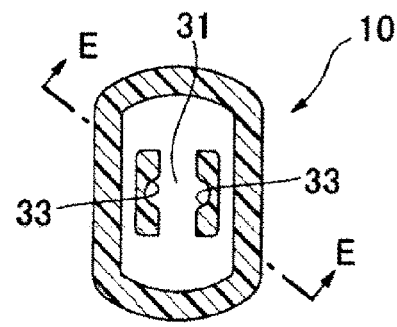
FIG. 15 is an end view at the cross-section at the D-D line of the second carpet grommet illustrated in FIG. 13.

The knob base 10 and knob 6 shall now be described in further detail with reference to FIGS. 18 to 24 as well as to FIGS. 9 to 17. In FIGS. 9 to 17, the flange knob base 10 of the second carpet grommet 9 is illustrated. The knob base 10 overall is formed in a tubular shape having a rectangular or oblong lateral cross-section. In the embodiment shown, the knob base 10 is formed in an untrue circular tubular shape in the lateral cross-section thereof, that is, in the shape of a true circle that is cut by two sides that are in mutual opposition in the direction of its diameter (FIG. 15). As already described, the through hole 22 in the first carpet grommet 7 is formed in a shape resembling the lateral cross-sectional shape of the knob base 10, and in this way, the knob base 10 passes through the through hole 22 in the first carpet grommet 7 but is prevented from turning about its axis. In the two outer surfaces in the knob base 10 that extend along the long sides of its lateral cross-sectional shape, respectively, the base latching parts 27 comprising latching shoulders are formed. When the knob base 10 is inserted into the through hole 22 of the first carpet grommet 7, it latches with the latching parts 21 (comprising elastic latching pawls) of the first carpet grommet 7, whereupon the knob base 10 (and, by extension, the second carpet grommet 9 also) is coupled to the first carpet grommet 7. In this manner, merely by inserting the knob base 10 into the through hole 22 of the tubular part 23 of the first carpet grommet 7, the latching parts 21 latch with the base latching parts 27 and the first carpet grommet 7 and second carpet grommet 9 are coupled.

The knob base 10 has a base apex part 30 at its upper end. The knob 6 passes through the base apex part 30 and is inserted into the knob base 10. The base apex part 30 is formed as a plate-shaped body in which a long hole 31 is formed for accepting the shank of the knob 6. The long hole 31, as a knob-receiving hole, is sized to allow passage of the shank of the knob 6 in the direction of its long sides while not separating by being pulled out in the direction of its shorter sides.

Figure 16:
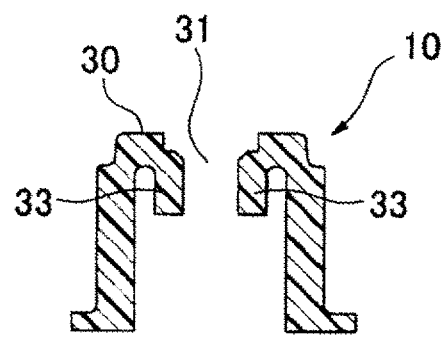
FIG. 16 is an end view at the section at the E-E line of the second carpet grommet illustrated in FIG. 15.
Figure 17:
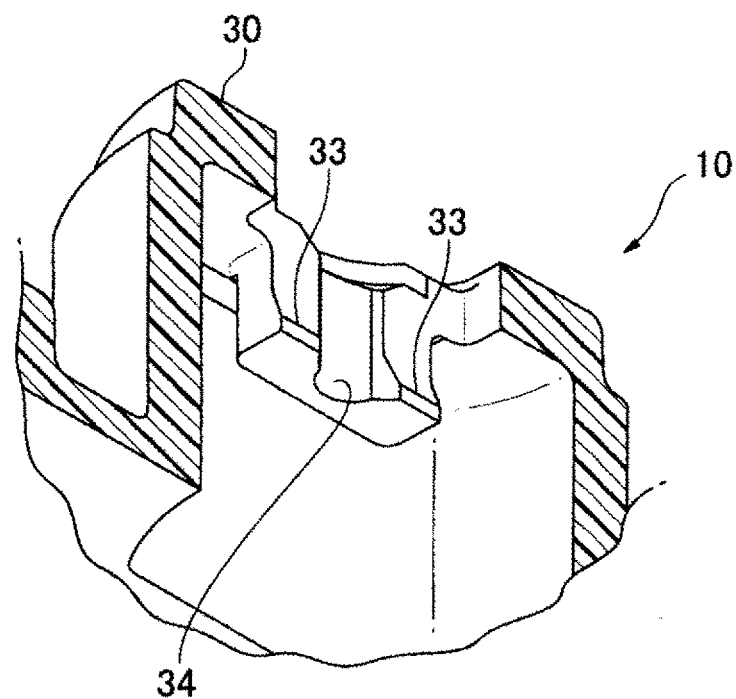
FIG. 17 is a half-sectional diagonal view of the knob base portion of the second carpet grommet illustrated in FIG. 10.
Figure 18:
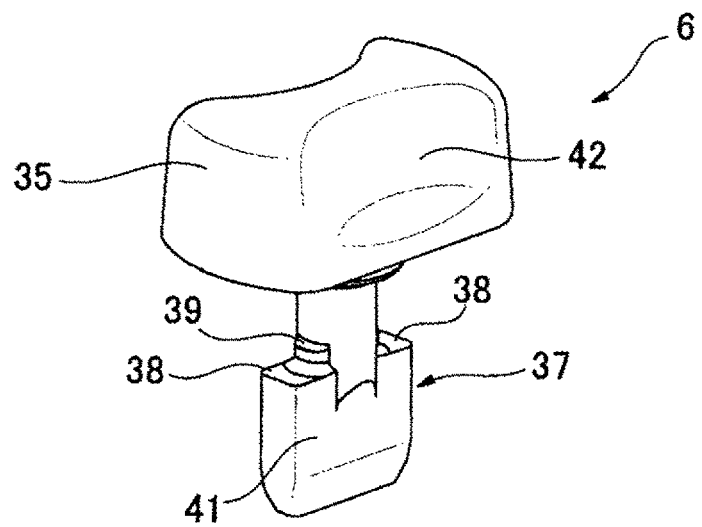
FIG. 18 is a diagonal view of the knob of the fastening assembly in accordance with the first embodiment of the present invention.
Figure 19:
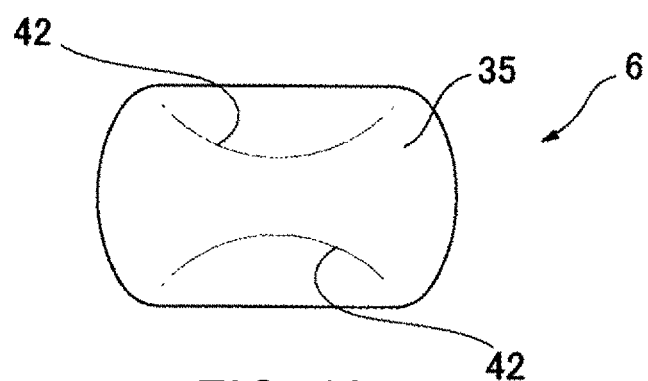
FIG. 19 is a plan of the knob illustrated in FIG. 18.
Figure 20:
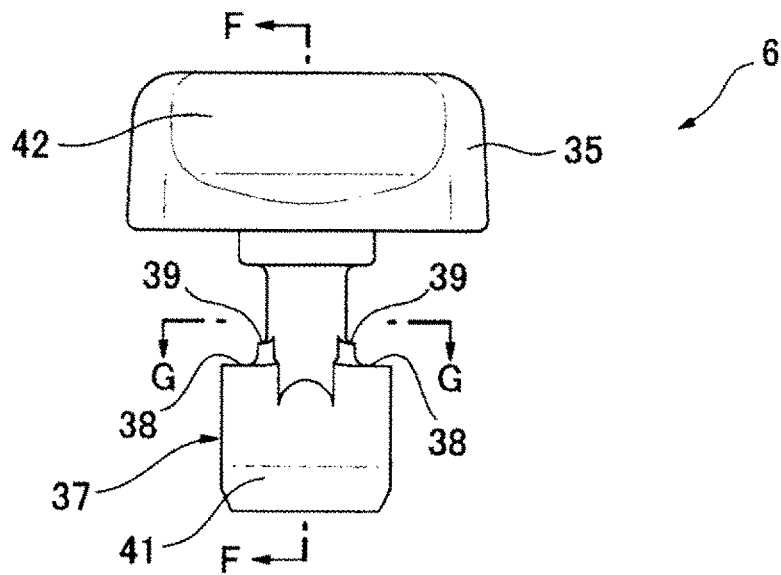
FIG. 20 is a front elevation of the knob illustrated in FIG. 19.
Figure 21:
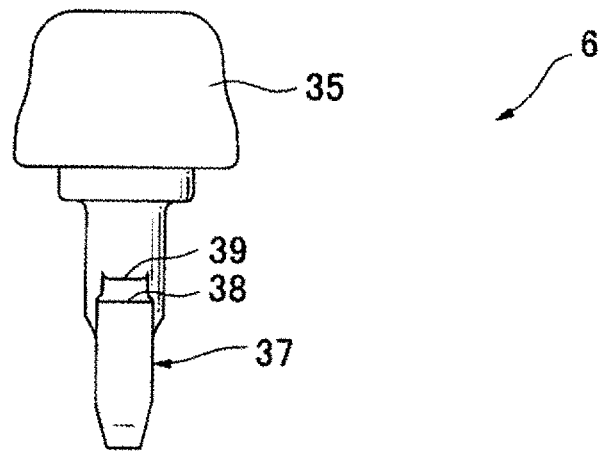
FIG. 21 is a right side elevation of the knob illustrated in FIG. 20.
Figure 22:
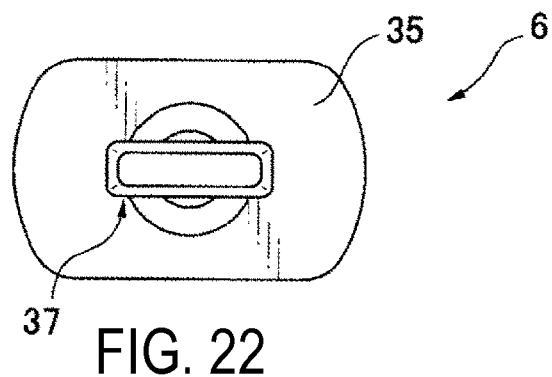
FIG. 22 is a bottom view of the knob illustrated in FIG. 20.
Figure 23:
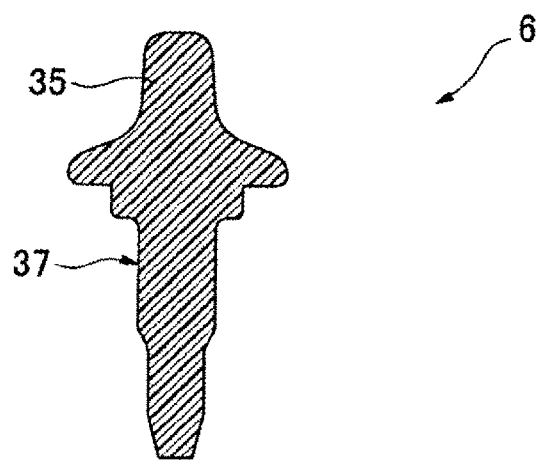
FIG. 23 is a section at the F-F line of the knob illustrated in FIG. 20.
Figure 24:
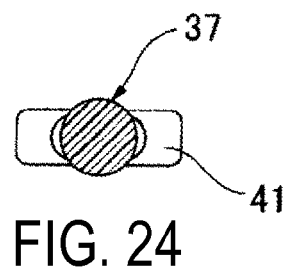
FIG. 24 is a section at the G-G line of the knob illustrated in FIG. 20.
Figure 25:
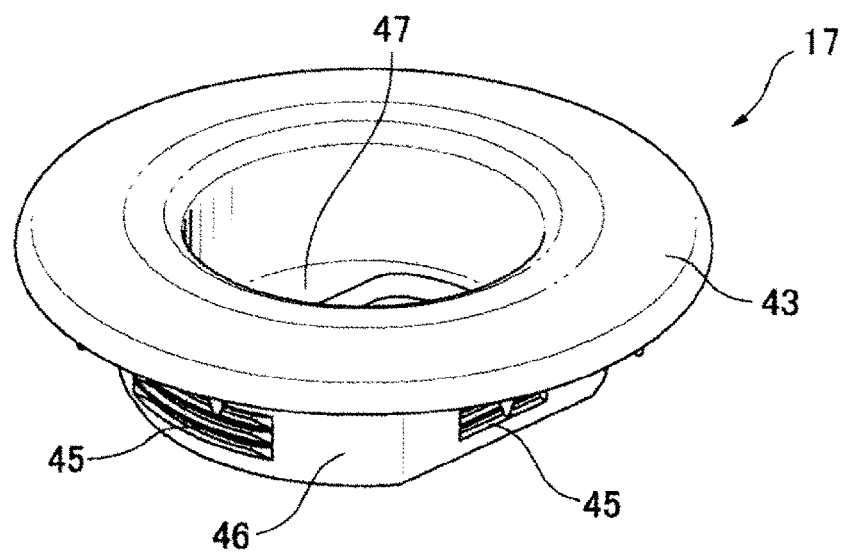
FIG. 25 is a diagonal view of a first mat grommet of the second fastener of the fastening assembly in accordance with the first embodiment of the present invention.
Figure 26:
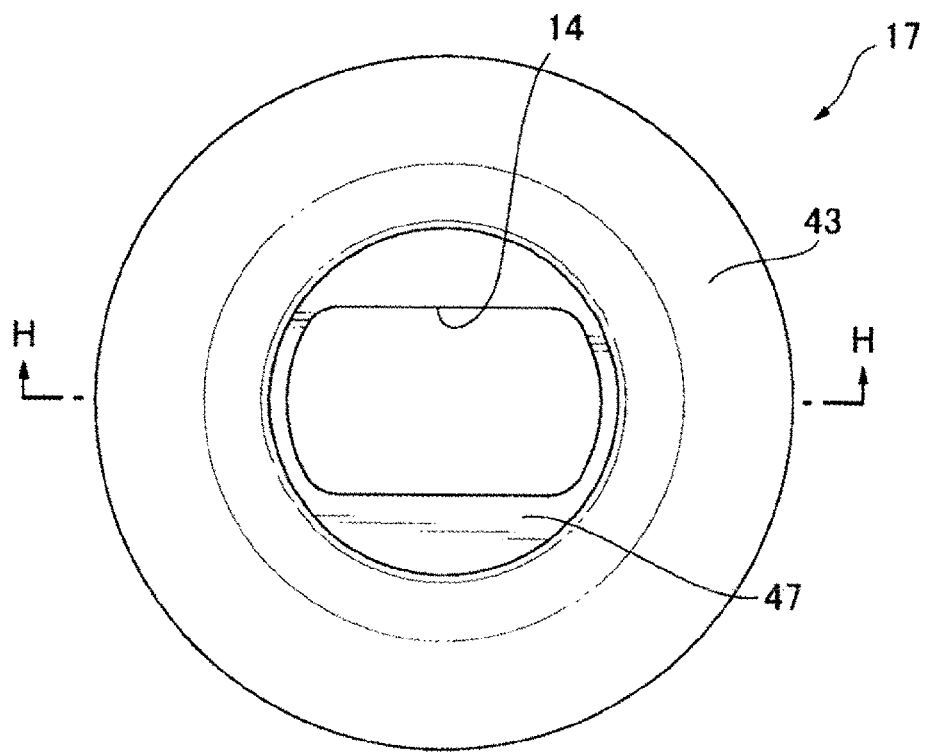
FIG. 26 is a plan of the first mat grommet illustrated in FIG. 25.
Figure 27:
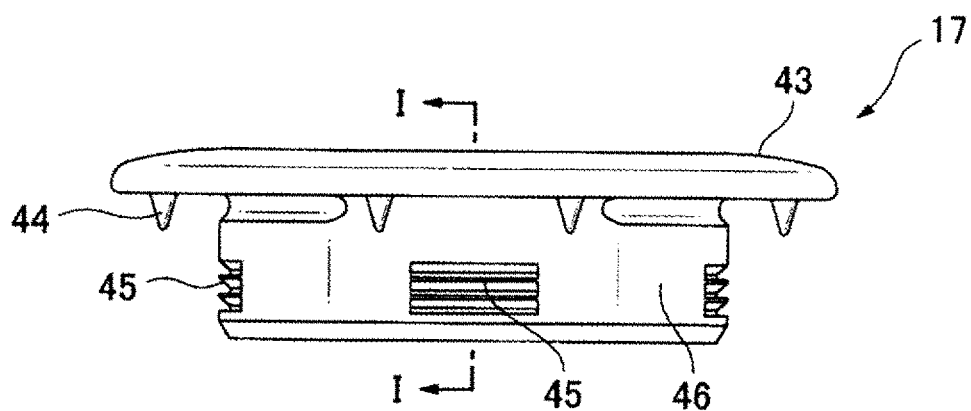
FIG. 27 is a front elevation of the first mat grommet illustrated in FIG. 26.
Figure 28:
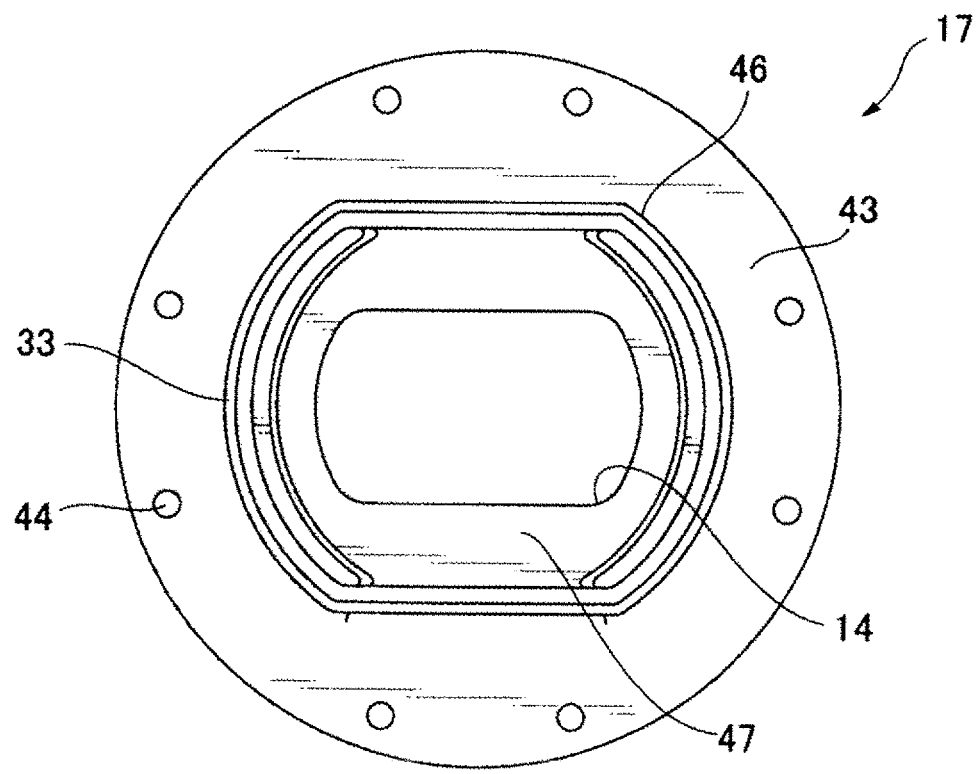
FIG. 28 is a bottom view of the first mat grommet illustrated in FIG. 27.
Figure 29:
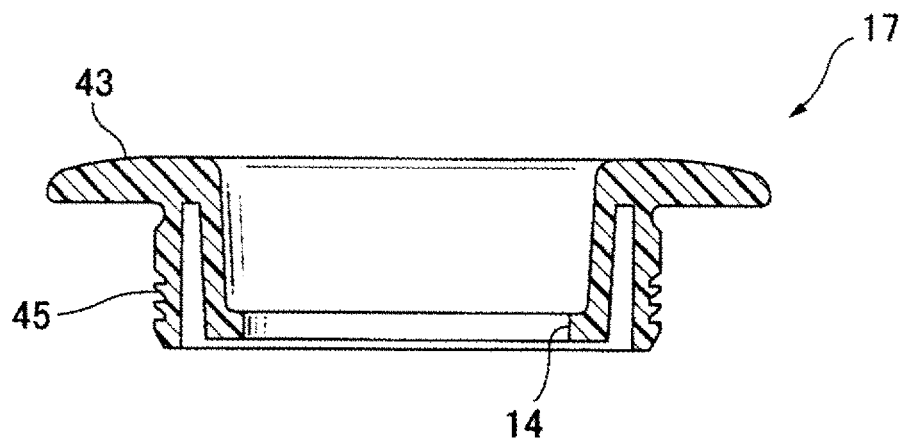
FIG. 29 is a section at the H-H line of the first mat grommet illustrated in FIG. 26.
Figure 30:
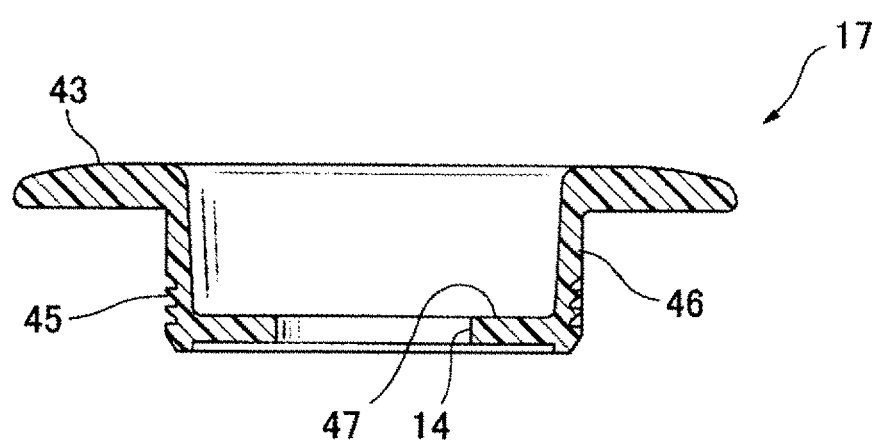
FIG. 30 is a section at the I-I line of the first mat grommet illustrated in FIG. 27.
Figure 31:
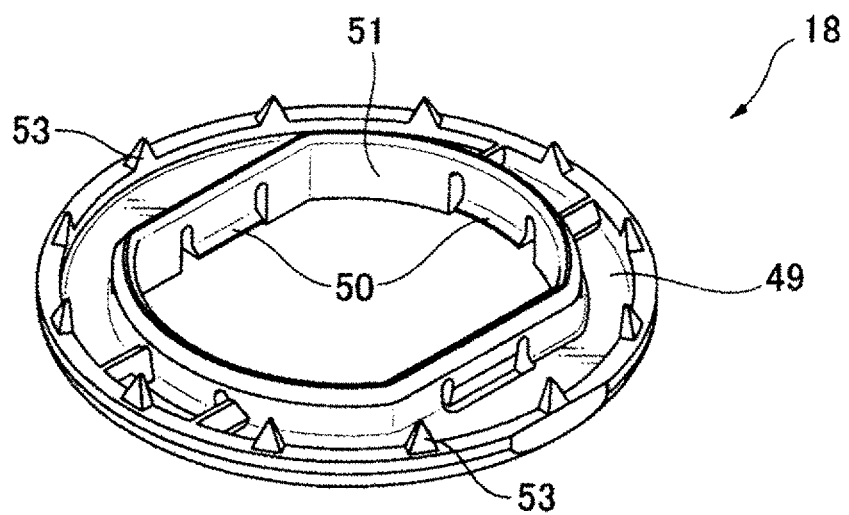
FIG. 31 is a diagonal view of a second mat grommet of the second fastener of the fastening assembly in accordance with the first embodiment of the present invention.
Figure 32:
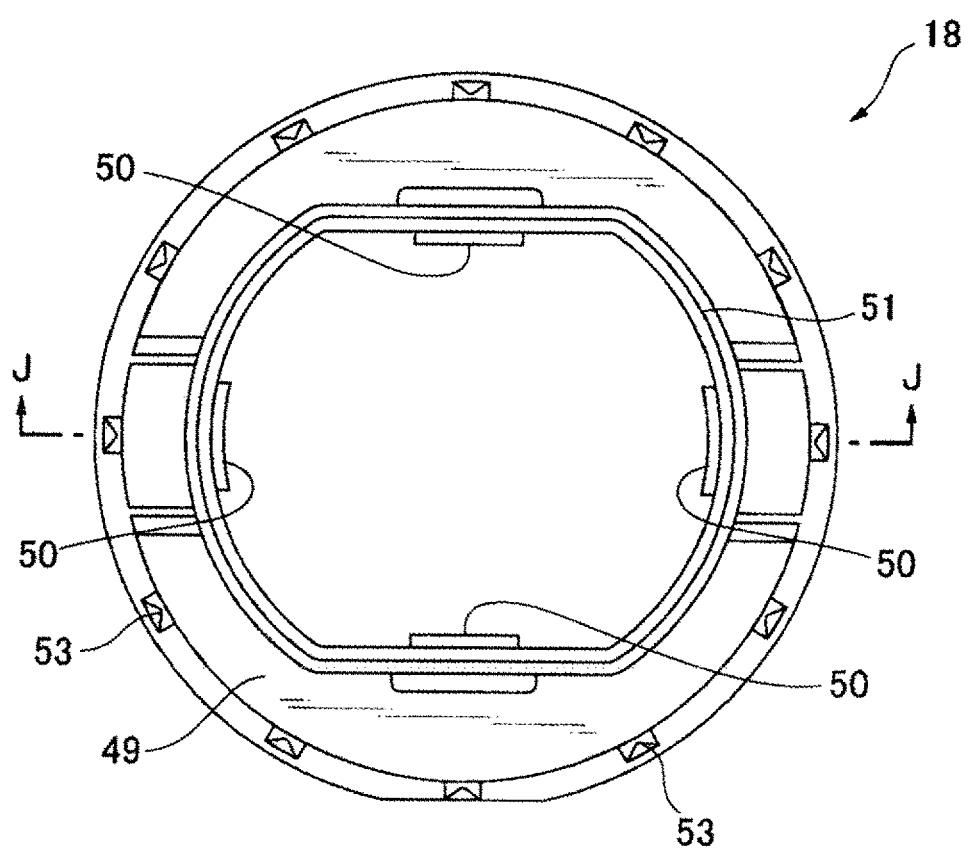
FIG. 32 is a plan of the second mat grommet illustrated in FIG. 31.
Figure 33:
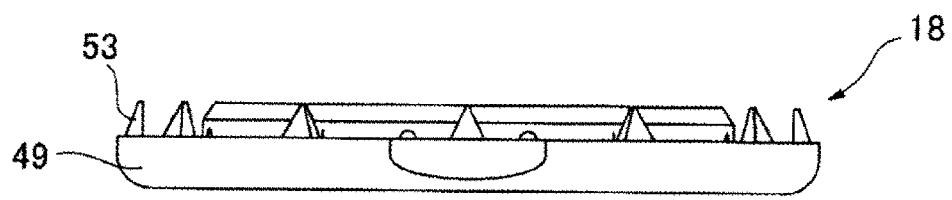
FIG. 33 is a front elevation of the second mat grommet illustrated in FIG. 32.
Figure 34:
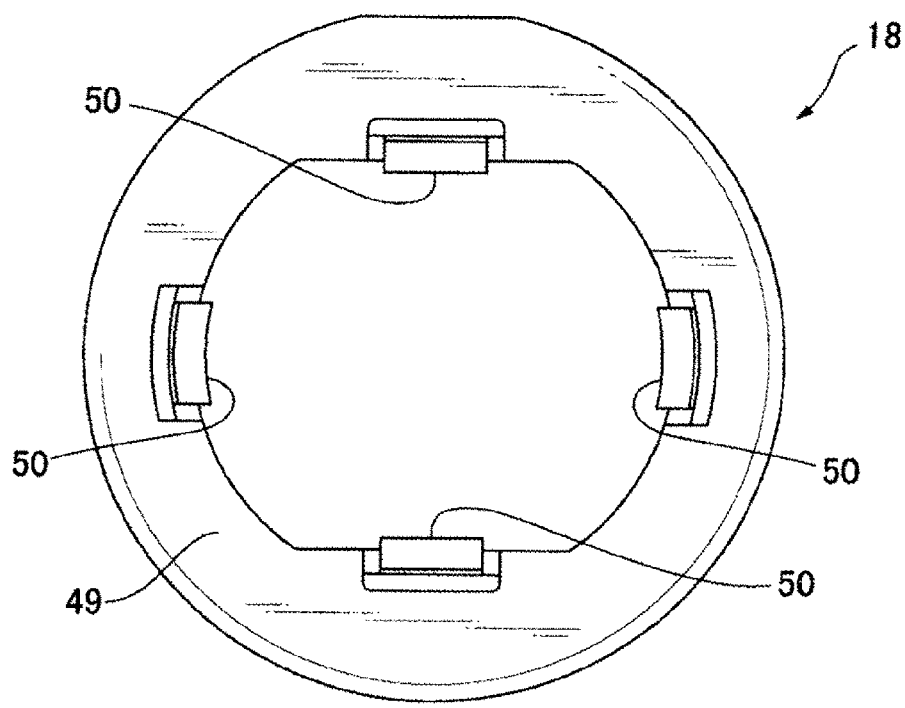
FIG. 34 is a bottom view of the second mat grommet illustrated in FIG. 33.
Figure 35:
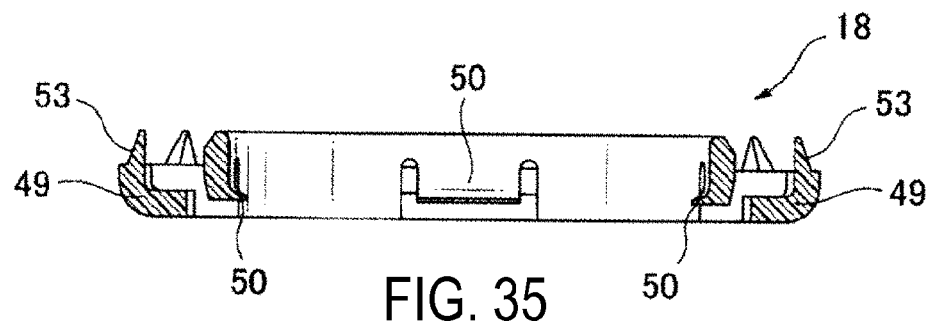
FIG. 35 is a section at the J-J line of the second mat grommet illustrated in FIG. 32.

In the base apex part 30, knob coupling latching pawls 33 are formed in a pair as latching means for coupling the knob 6 to the knob base 10 when the shank of the knob 6 is inserted into the knob base 10. The knob coupling latching pawls 33, as illustrated in FIGS. 16 and 17, comprise elastic latching pawls that descend a certain length from the base apex part 30. Because the space inside the knob base 10 is broad, the knob coupling latching pawls 33 are formed of sufficient size and strength to definitely latch onto the latching shoulders in the knob shank. Consequently, the strength by which the knob 6 latches to the knob base 10 is maintained even higher. The knob coupling latching pawls 33 are formed in the shape of plates that extend from the base apex part 30 of the knob base 10 of the tubular body toward the flange 26. Midway along the knob coupling latching pawls 33, in direction of its width, channels 34 which form the outer contour of the knob acceptance hole 31, are formed in the axial direction. In the channel 34 portion, the knob coupling latching pawls are formed as thin plates readily flexing outward when the knob shank 37 is inserted into the knob acceptance hole 31, facilitating insertion of the knob shank 37.

Moreover, in the knob coupling latching pawls 33 of the knob base 10, the channels 34 that are oriented in the axial direction for accepting projections 39 formed in the latching shoulders of the shank of the second carpet grommet 9, are formed. These channels 34 are disposed at positions for receiving the projections 39 when the knob 6 is in the locked position. Consequently, completion of turning to the locked position can be felt by a sensation in one's fingers, also facilitating securing the locked position. More specifically, the projections 39 of the knob shank 37 and the channels 34 of the knob base 10 are formed in such shapes that, when the knob shank 37 is turned to the locked position, the projections 39 elastically fit into and mate with the channels 34 by the elasticity of the knob coupling latching pawls 33. While manipulating the first fastener 5, the operator definitely feels the clicking sensation of having turned to the locked position that occurs at the completion of the securing operation. The projections 39 of the knob shank 37 and the channels 34 of the knob base 10 are shaped such that, in the mated state, the projections fill up the channels 34 in the lateral cross-section of the knob shank. This operation is illustrated in FIG. 39 from (A) to (C). When the knob 6 is in the locked position, play in the turning direction can be prevented.

The knob 6 is illustrated in FIGS. 18 to 24. The knob 6 has a knob head 35 that abuts against the peripheral portion of the through hole 14 (of the first mat grommet 17) of the second fastener 15 and the knob shank 37 which is inserted into the long hole 31 of the base apex part 30 of the knob base 10. At intermediate positions in the knob shank 37, latching shoulders 38 are formed as latching means for latching the knob coupling latching pawls 33 of the knob base 10. In the latching shoulders 38 of the knob shank 37, the projections 39 which protrude from the latching shoulders 38 in both the axial and radial directions, are formed. The projections 39 are sized to fit into and mate with the channels 34 of the knob coupling latching pawls 33 of the knob base 10. The projections 39 of the knob shank 37 and the channels 34 of the knob base 10 are shaped such that, when the knob shank 37 turns about its axis to the locked position (FIG. 38 and FIG. 39(C)), the projections 39 elastically fit into and mate with the channels 34 by the elasticity of the channels 34. In this way, by manipulating the knob, the operator definitely feels the clicking sensation of having turned to the locked position that occurs at the completion of the securing operation. The projections 39 of the knob head 35 and the channels 34 of the knob base 10 are shaped such that the projections 39 will fill up the channels 34 in the lateral cross-section of the knob head 35 in the mated state. Consequently, turning in the locked position is locked, and play in the turning direction can be prevented.

Moreover, the knob shank 37, from the knob head 35 to the position of the latching shoulders 38, is formed in a rod shape (in a round shape in the example diagrammed), and from the latching shoulders 38 to the tip end (the lower end in FIG. 18), is formed as a plate-shaped body (part 41) having a rectangular lateral cross-section. The plate-shaped body portion 41 of the knob shank 37 is formed so that its width on the long sides of the rectangular lateral cross-section is equal to or slightly less than the length of the short sides of the rectangular lateral cross-section corresponding to the inside of the base latching parts 27. When the knob head 35 is in the locked position (FIG. 38), play between the knob 6 and knob base 10 (or first fastener 5) in the locked position is prevented. Because play can be prevented, the knob 6 is firmly secured to the first fastener 5 through the knob base 10; thus, even if the floor mat 11 is pulled so that the fastening assembly 1 is pulled so as to be separated, the force of that pulling can be withstood by a strong holding force.

In the knob shank 37, latching means are formed for coupling the knob 6 to the knob base 10 when the knob shank 37 is inserted into the knob base 10. These latching means are formed by the latching shoulders 38 that latch with the knob coupling latching pawls 33 of the knob base 10. The latching shoulders 38 may be of any shape so long as they can latch with the knob coupling latching pawls 33 of the knob base 10. In the embodiment shown, they are formed by narrowing the width of the portion of the wide portion of the knob shank 37 corresponding to the positions at which the knob coupling latching pawls 33 can latch. Accordingly, when the knob shank 37 is inserted into the knob base 10 and thoroughly pushed in, the knob coupling latching pawls 33 of the knob base 10 will latch on the latching shoulders 38 and the knob 6 will be coupled to the knob base 10. Moreover, immediately after that pushing in, the knob shank 37 will be in the unlocked position, but the latching shoulders 38 will be partially latched to. Therefore, merely by inserting the knob shank 37 into the knob base 10 and thoroughly pushing it in just as it is, the knob 6 will be coupled to the knob base 10. After that pushing in, by turning the knob shank 37 about its axis, through an angle of 90 degrees, for example, the latching shoulders 38 will latch with the knob coupling latching pawls 33 over a wide surface area, and the knob 6 will be definitely coupled to the knob base 10. Furthermore, by that turning, the knob shank 37 is placed in the locked position. In the locked position, the coupling between the knob 6 and knob base 10 is maintained definitely.

In the latching shoulders 38 of the knob shank 37, the projections 39, which protrude in the axial direction from the latching shoulders 38 toward the knob head 35, are formed. These projections 39 can fit into and mate with the channels 34 that, oriented in the axial direction, are formed in the knob coupling latching pawls 33 of the knob base 10. That is, when the knob shank 37 is turned to the locked position, the projections 39 fit into and mate with the channels 34. By this mating, the operator can feel that the knob shank 37 has been completely turned to the locked position by placing his or her fingers on the knob head 35. Moreover, by the mating of the projections 39 in the channels 34, the knob shank 37 is maintained in the locked position so the knob 6 can be fixed in the locked position. In the knob head 35, finger-gripping parts 42 are formed for turning the knob shank 37 about its axis.

The second fastener 15 shall now be described in detail with reference to FIGS. 25 to 35. In FIGS. 25 to 30, the first mat grommet 17 of the second fastener 15 is illustrated. The first mat grommet 17 has a flange 43 that abuts against the peripheral portion of the attachment hole 13 in the floor mat 11 and multiply stepped latching parts 45 that can work together as latching means with the second mat grommet 18 to couple to the second mat grommet 18 with the floor mat 11 in a clamped state. The latching parts 45 are formed, on the outer surfaces of a tubular part 46 that descends from the flange 43, in the shape of grooves that run along the outer circumferential surface in multiple steps in the axial direction. On the inner wall of the tubular part 46 forming the through hole 14, a latching part 47 is formed, against which the head of the knob 6 abuts. This latching part 47 is formed as a plate-shaped body that extends from the inner wall surface of the tubular part 46 forming the through hole 14 toward the center. In the latching part 47, the long hole 14 through which the head of the knob 6 can pass, is formed. This long hole 14 is shaped (an ellipse in the example illustrated) such that, when the knob 6 is in the unlocked position (FIG. 40), the head of the knob can pass through, but when in the locked position (FIG. 41), the head of the knob abuts against it and cannot pass through. The height of the tubular part 46 is determined to match the thickness of the floor mat 11. In the outer circumferential edge of the flange 43, numerous sharp points 44 are formed which stick into the floor mat 11 to prevent the second fastener 15 from positionally shifting or turning about its axis.

In the inner wall of the tubular part 46 forming the through hole 14, the knob latching part 47 against which the knob head 35 of the knob 6 abuts is formed. The knob latching part 47 is formed as a plate-shaped body that extends from the inner wall surface of the tubular part 46 forming the through hole 14 toward the center. In the knob latching part 47, the through hole 14 through which the knob head 35 can pass, is formed. The through hole 14 is formed as a long hole sized such that, in the direction of its long sides, it will allow the knob head 35 to pass through, but in the direction of its short sides, the knob head 35 cannot separate by being pulled out.

In FIGS. 31 to 35, the second mat grommet 18 of the second fastener 15 is illustrated. The second mat grommet 18 has a flange 49 that abuts against the peripheral portion of the attachment hole 13 in the floor mat 11 and two pairs of latching parts 50 that as latching means can work with the first mat grommet 17 to couple to the latching parts 45 of the first mat grommet 17 with the floor mat 11 in a latched state. The latching parts 50 are formed in a tubular part 51 that rises slightly to encompass the tubular part 46 of the first mat grommet 17 and latch with the latching parts 45. Furthermore, in the outer circumferential edge of the flange 49, numerous sharp points 53 are formed which stick into the floor mat 11 and prevent the second fastener 15 from positionally shifting or turning about its axis. Configured in this manner, the first mat grommet 17 is disposed on the front surface of the floor mat 11, while the second mat grommet 18 is disposed on the back surface of the floor mat 11. The latching part 47 accepts the head of the knob 6 into its through hole 14.

Figure 36A:
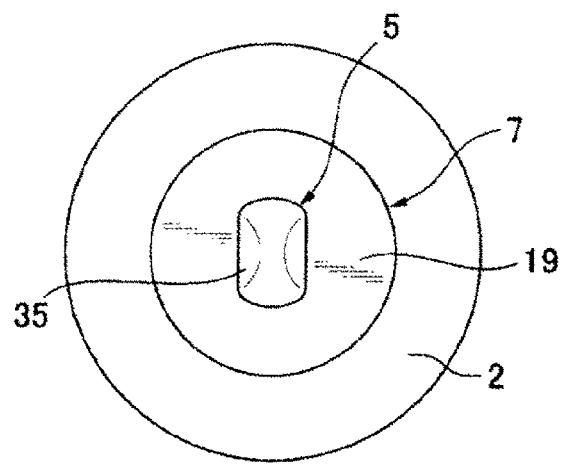
FIG. 36 diagrams the manner in which the first fastener of the fastening assembly in accordance with the first embodiment of the present invention is attached to a carpet by the knob, with (A) being a plan thereof, (B) a front elevation thereof, and (C) a bottom view thereof.
Figure 36B:
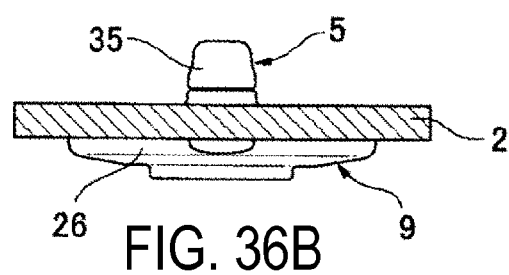
Figure 36C:
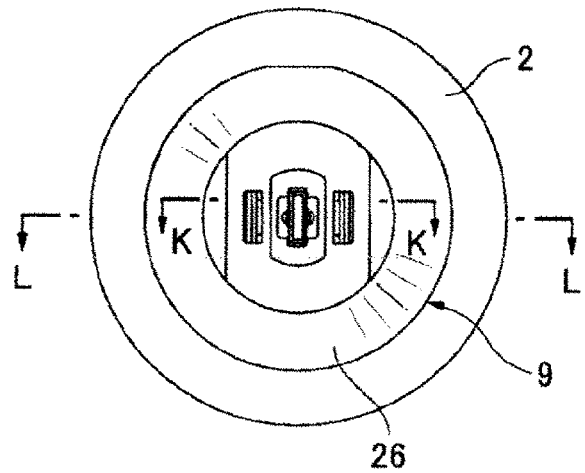
Figure 37:
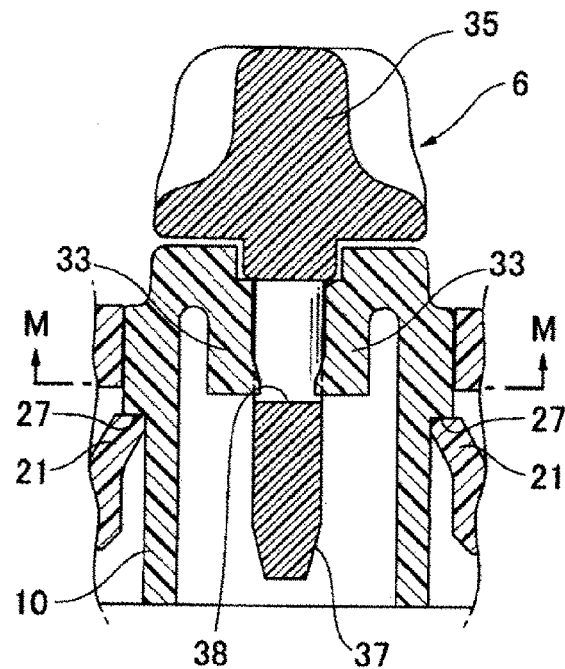
FIG. 37 is a section at the K-K line in FIG. 36(C) which illustrates the relationship between the knob and the knob base attached to a carpet.

In FIG. 36(A) to (C), the state of the first fastener 5 being attached to the carpet 2 by the knob 6, by the operation shown in FIG. 1, is illustrated. The first carpet grommet 7 of the first fastener 5 is disposed at the attachment hole 3 of the carpet 2, the knob base 10 of the second carpet grommet 9 is disposed in a position for insertion into the attachment hole 3, and the tubular part 23 of the first carpet grommet 7 is pushed in so as to be accepted in the knob base 10. By this pushing in, the latching parts 21 of the tubular part 23 of the first carpet grommet 7 latch with the base latching parts 27 of the knob base 10, and the first carpet grommet 7 and second carpet grommet 9 are attached in a state in which the carpet 2 is clamped. Meanwhile, the knob 6 is pushed into the knob base from the long hole 31 (knob reception hole) in the base apex part 30 of the knob base 10, the latching shoulders 38 of the knob shank 37 latch with the knob coupling latching pawls 33 of the knob base 10, and in this way, the knob 6 is coupled to the knob base 10 in the unlocked position. FIG. 37, which is a section at the K-K line in FIG. 36(C), illustrates the manner in which the latching shoulders 38 of the knob shank 37 latch with the knob coupling latching pawls 33 of the knob base 10 and the manner in which the knob 6 is latched to the knob base 10 in the unlocked position.

In order to secure the floor mat 11 to the carpet 2, the second fastener 15 must be attached to the floor mat 11, as illustrated in FIG. 2. The tubular part 46 of the first mat grommet 17 is disposed at a position for insertion into the attachment hole 13 of the floor mat 11, the tubular part 51 of the second mat grommet 18 is disposed at a position for insertion into the attachment hole 13, and the tubular part 46 of the first mat grommet 17 is pushed in so as to be accepted in the tubular part 51. By this pushing in, the latching parts 45 of the tubular part 46 latch with the latching parts 50 of the tubular part 51, and the first mat grommet 17 and second mat grommet 18 are attached in a state wherein the floor mat 11 is clamped. As illustrated in FIG. 3, furthermore, against the carpet 2 to which the first fastener 5 and knob 6 are attached, the floor mat 11 to which the second fastener 15 has been attached is disposed. When that is done, the knob latching part 47 forming the through hole 14 in the first mat grommet 17 of the second fastener 15 is disposed so that the knob head 35 of the knob 6 that is in the unlocked position passes through the through hole 14; thus, the floor mat 11 to which the second fastener 15 has been attached is pressed, as is, against the carpet 2 to which the first fastener 5 and knob 6 have been attached. When the knob head 35 passes through the through hole 14 and comes out above the knob latching part 47, the operator manipulates the finger-gripping parts 42 of the knob head 35, turning the knob shank 37 by an angle of 90 degrees about its axis and moving the knob 6 from the unlocked position to the locked position.

Figure 39A:
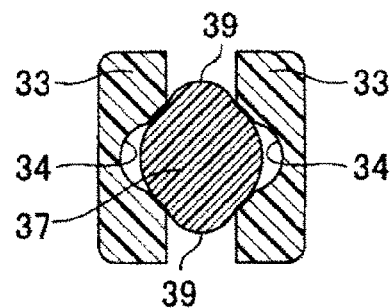
FIG. 39 diagrams the relationship between a knob shank and knob coupling latching pawls when the knob shank has been turned from an unlocked position to a locked position, with (A) being a section at the M-M line in FIG. 37, in the unlocked position, (B) being a section at the M-M line in FIG.
Figure 39B:
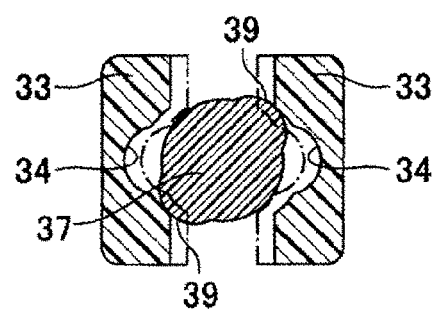
Figure 39C:
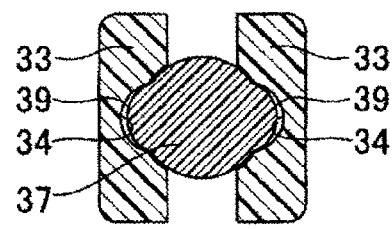

FIG. 38 and FIG. 39(A) to (C) illustrate the manner in which the knob 6 is turned 90 degrees about the axis of the knob shank 37 to move the knob 6 from the unlocked position to the locked position. When the knob 6 is turned 90 degrees about the axis of the knob shank 37, passing from the unlocked position diagrammed in FIG. 39(A) to the intermediate state diagrammed in FIG. 39(B), the locked position diagrammed in FIG. 38 and FIG. 39(C) is reached. As previously described, in the knob coupling latching pawls 33 of the knob base 10, channels 34 are formed in the axial direction for accepting the projections 39 formed in the latching shoulders 38 of the knob shank 37 of the second carpet grommet 9, which channels 34, when the knob 6 is in the locked position, are disposed at positions for accepting the projections 39. Consequently, it is possible to feel a clicking sensation with one's fingers when the turning to the locked position is complete; this is also useful in securing the locked position. The projections 39 of the knob shank 37 and the channels 34 of the knob base 10 are shaped so that in the mated state, in the lateral cross-section of the knob shank 37, the projections 39 fill up the channels 34 (FIG. 39(C)). Consequently, the turning about the axis of the knob 6 in the locked position is locked, and play in the turning direction can be prevented. Furthermore, the width on the longer side of the rectangular lateral cross-section of the plate-shaped body part 41 of the knob shank 37 is formed so as to be a dimension equal to or slightly less than the length of the shorter sides of the rectangular lateral cross-section corresponding to the inside of the base latching parts 27 of the tubular part of the knob base 10. When the knob 6 is in the locked position, play between the knob 6 and the knob base 10 (and, by extension, the first fastener 5 also) in the locked position can be prevented, as illustrated in FIG. 38. Also, because play can be prevented and the knob 6 is firmly secured to the first fastener 5 through the knob base 10, even if the floor mat 11 is pulled so that the fastening assembly 1 is separated by being pulled out, that pulling force can be tolerated by the strong holding force.

FIG. 40 shows the operation illustrated in FIG. 3 and the operation of moving the knob 6 to the locked position, such that the floor mat 11 is attached to the carpet 2 by the fastening assembly 1. As previously described, the operation of combining a floor mat with a carpet is facilitated, separation after such combining can be prevented, the holding force of the knob 6 can be enhanced, and appearance after combining by the fastening assembly 1 is good. Because the knob coupling latching pawls 33 for coupling the knob 6 to the knob base 10 can be formed in the spacious interior of the knob base 10, not only can the knob coupling latching pawls 33 be readily flexed, but the coupling strength for the knob 6 can be enhanced, play in the turning direction of the knob 6 can be prevented, and play in the locked position can be prevented; thus, separation by pulling on the floor mat 11 can be definitely prevented.

A fastening assembly 101 for securing a floor mat to a carpet in accordance with a second embodiment of the present invention shall now be described. FIGS. 41 to 43 diagram the overall configuration when the fastening assembly 101, comprising a plurality of components, is used; thus, a simple description of the configuration of the fastening assembly 101 shall now be given with reference to FIGS. 41 to 43. FIG. 41 shows a first fastener 103 attached to an attachment hole in a carpet 102 to reinforce the peripheral portion of the attachment hole, with a through hole in its center, as well as a knob assembly 105 attached to the first fastener by being inserted into the through hole in the first fastener 103. FIG. 42 shows a second fastener 107 attached to an attachment hole in a floor mat 106 to reinforce the peripheral portion of the attachment hole, with a through hole in its center. FIG. 43 shows the manner in which the floor mat 106 is secured to the carpet 102 by the combination of the first fastener 103 and knob assembly 105 attached to the carpet 102 and by the second fastener 107 attached to the floor mat 106, as illustrated in FIG. 42. For convenience, moreover, the carpet 102 and the floor mat 106 are represented in the drawings as circular plate-shaped members, but their actual shapes in most cases will not be the shapes indicated in FIGS. 41 to 43. It should be understood that the carpet 102, for example, will be in a sheet form spreading over a floor panel, and that the floor mat 106 will be formed in a prescribed sheet form.

In FIG. 41, the knob assembly 105 comprises a knob base 109 that is inserted into the through hole in the first fastener 103 and coupled to the fastening assembly 101 (FIG. 43) and a knob 110 coupled to the knob base 109. The first fastener 103 comprises a first carpet grommet 113 and a second carpet grommet 114 for clamping the peripheral portion of an attachment hole 111 in the carpet 102 from both sides. The first carpet grommet 113 and the second carpet grommet 114, respectively, have a flange that abuts against the peripheral portion of the attachment hole 111 in the carpet 102 and latching means capable of coupling the carpet 102 in a clamped state. In FIG. 42, the second fastener 107 comprises a first mat grommet 117 and a second mat grommet 118 for clamping the peripheral portion of an attachment hole 115 in the floor mat 106 from both sides. The first mat grommet 117 and the second mat grommet 118, respectively, have flanges that abut against the peripheral portion of an attachment hole in a floor mat, and latching means capable of coupling the floor mat 106 in a clamped state. The knob base 109, knob 110, first carpet grommet 113, second carpet grommet 114, first mat grommet 117 and second mat grommet 118, respectively, are each integrally molded of a plastic material. In FIG. 41, moreover, the knob assembly 105 should preferably be attached to the first fastener 103 only when attaching the floor mat 106 to the carpet 102. The knob assembly 105, furthermore, when coupled to the first fastener 103, is such that the knob 110 can be turned about its axis relative to the knob base 109, to assume either the unlocked position illustrated in FIG. 80 or the locked position illustrated in FIG. 81.

A detailed description of the first fastener 103 shall now be given with reference to FIGS. 44 to 53. First, in FIGS. 44 to 49, the first carpet grommet 113 of the first fastener 103 is illustrated. In the first carpet grommet 113 are a flange 119 that abuts against the peripheral portion of the attachment hole in the carpet 102 and latching parts 121 that, as latching means, can work together with the second carpet grommet 114 to couple to the second carpet grommet 114 with the carpet 102 in a clamped state. The latching parts 121 are formed in a pair at the outer surface of a tubular part 123 that descends so as to encompass a through hole 122 formed in the flange 119. Inside the tubular part 123, a pair of latching shoulders 125 is formed which latch with the knob base 109. The through hole 122, which extends from the knob 110 to the tubular part 123, is either of oblong shape (an untrue circular shape in which a true circle is cut by two sides in mutual opposition in the direction of its diameter), as shown, or of rectangular shape. The height of the tubular part 123 is determined to match the thickness of the carpet 102. In the lower end of the tubular part 123, moreover, it is preferable that a bottom surface 124 (FIG. 49) be formed so as to maintain high strength in the tubular part 123.

Next, in FIGS. 50 to 53, the second carpet grommet 114 of the first fastener 103 is illustrated. The second carpet grommet 114 has a flange 126 that abuts against the peripheral portion of an attachment hole in the carpet 102 and a pair of latching parts 127 that, as latching means, can work together with the first carpet grommet 113 to couple with the latching parts 121 of the first carpet grommet 113 with the carpet 102 in a clamped state. The latching parts 127 are formed in a tubular part 129 that rises slightly to encompass the tubular part 123 of the first carpet grommet 113 and latch with the latching parts 121. In the outer circumferential edge of the flange 126, furthermore, numerous sharp points 130 are formed which stick into the floor mat 102 and prevent the first fastener 103 from shifting or turning about its axis. The first carpet grommet 113, configured in this manner, is disposed on the front surface of the carpet 102, while the second carpet grommet 114 is disposed on the back surface of the carpet 102. The knob assembly 105 is inserted from the first carpet grommet 113 into the second carpet grommet 114 and coupled to the first fastener 103.

A detailed description of the second fastener 107 shall now be given, with reference to FIGS. 54 to 64. In FIGS. 54 to 59, the first mat grommet 117 of the second fastener 107 is illustrated. The first mat grommet 117 has a flange 131 that abuts against the peripheral portion of an attachment hole in the floor mat 106 and latching parts 133, and multiply stepped latching parts 133 that, as latching means, can work together with the second mat grommet 118 to couple to the second mat grommet 118 with the floor mat 106 in a clamped state. The latching parts 133 are formed on the outer surfaces of a tubular part 135 that descends to encompass a through hole 134 formed in the flange 131 in the shape of grooves that run along the outer circumferential surface in multiple steps in the axial direction. On the inner wall of the tubular part 135 forming the through hole 134, a latching part 137 is formed, against which the head of the knob 110 abuts. This latching part 137 is formed as a plate-shaped body that extends from the inner wall surface of the tubular part 135 forming the through hole 134 toward the center. In the latching part 137 is formed the long hole 138, through which the head of the knob 110 can pass. This long hole 138 is shaped (as an ellipse in the example shown) such that, when the knob 110 is in the unlocked position (FIG. 80), the knob head 153 can pass through, but when in the locked position (FIG. 81), the knob head 153 abuts against it and cannot pass through. The height of the tubular part 135 is determined to match the thickness of the floor mat 106.

In FIGS. 60 to 64, the second mat grommet 118 of the second fastener 107 is illustrated. The second mat grommet 118 has a flange 139 that abuts against the peripheral portion of the attachment hole in the floor mat 106 and a pair of latching parts 141 that, as latching means, can work together with the first mat grommet 117 to latch with the latching parts 133 of the first mat grommet 117 with the floor mat 106 in a clamped state. The latching parts 141 are formed in a tubular part 142 that rises slightly to encompass the tubular part 135 of the first mat grommet 117 and latch with the latching parts 133. In the outer circumferential edge of the flange 139, numerous sharp points 143 are formed that stick into the floor mat 106 and prevent the second fastener 107 from shifting or turning about its axis. The first mat grommet 117, configured in this manner, is disposed on the front side of the floor mat 106, and the second mat grommet 118 is disposed on the back side of the floor mat 106. In its long hole 138, the latching part 137 accepts the knob head 153 of the knob 110 of the knob assembly 105.

A detailed description of the knob assembly 105 shall now be given with reference to FIGS. 65 to 78. In FIGS. 65 to 71, the knob base 109 of the knob assembly 105 is illustrated. The knob base 109 overall is tubular shaped with a lateral cross-section that is either rectangular or oblong. In the embodiment shown, the knob base 109 is an untrue circular shape in which a true circle, in the lateral cross-section, is cut by two sides in mutual opposition in the direction of its diameter. As already described, the through hole 122 in the first fastener 103 (formed in the first carpet grommet 113) is shaped similar to the lateral cross-sectional shape of the knob base 109. Consequently, the knob base 109 passes through the through hole 122 but is prevented from turning about its axis. In the knob base 109, a base flange 145 is formed to wind about the outer circumferential surface thereof at an intermediate position in the axial dimension of the knob base 109. The base flange 145 is sized to abut against the peripheral portion of the through hole 122 of the first carpet grommet 113 and not pass through the through hole 122, thus also aiding the coupling of the knob base 109 to the first carpet grommet 113. In the knob base 109, on the two outer surfaces running in the direction of the long sides of the lateral cross-sectional shape of the knob base, respectively, base latching pawls 146 are formed. When the knob base 109 is inserted into the through hole 122 of the first carpet grommet 113, the base latching pawls 146 latch on the latching shoulders 125 of the first carpet grommet 113 to couple the knob base 109 to the first carpet grommet 113 (and, by extension, to the first fastener 103 as well). In this coupling, the base flange 145 of the knob base 109 abuts against the flange 119 of the first carpet grommet 113; thus, the base latching pawls 146 latch on the latching shoulders 125 and couple the knob base 109 to the first carpet grommet 113 (and, by extension, to the first fastener 103 as well).

The base latching pawls 146 of the knob base 109, respectively, comprise thin plate-shaped bodies that extend from the end of the knob base 109 (the lower end in FIG. 68) toward the base flange 145 to elastically protrude to the outside from the outer surfaces of the knob base 109 (FIGS. 66 and 70). Consequently, the force needed for insertion into the through hole 122 (of the first carpet grommet 113) of the first fastener 103 is reduced. Upon insertion, the flange 119 coupled to the knob base 109 will be in the unlocked position (FIG. 78, FIG. 79).

The knob base 109, furthermore, has a base apex part 147 at its upper end, through which base apex part 147 the knob 110 is inserted into the knob base 109. The base apex part 147 is formed as a plate-shaped body in which a long hole 149 is formed for accepting the shank of the knob 110. The long hole 149 sized to allow the shank of the knob 110 to pass through in its long-side direction, but the knob cannot be pulled out in the short-side direction.

In the base apex part 147 is formed a pair of knob coupling latching pawls 150 that, as latching means, couple the knob 110 to the knob base 109 when the shank of the knob 110 is inserted into the knob base 109. The knob coupling latching pawls 150, as illustrated in FIGS. 70 and 71, are formed as elastic latching pawls that descend a certain length from the base apex part 147. In the knob coupling latching pawls 150 of the knob base 109, furthermore, channels 151 are formed in the axial direction for accepting projections formed in the latching shoulders of the shank of the knob 110, which channels 151 are disposed at positions for accepting the projections when the knob 110 is in the locked position. Consequently, one can feel the sensation in one's fingers of completing the turning to the locked position; this is also useful in securing the locked position. Because the space inside the knob base 109 is wide, the knob coupling latching pawls 150 are formed to be of sufficient size and strength to definitely latch on the latching shoulders of the knob shank. Consequently, the strength by which the knob 110 is coupled to the knob base 109 is even greater. The knob coupling latching pawls 150 are formed in plate shapes that extend downward from the base apex part 147 of the tubular-body knob base 109. Where the channels 151 are forming the outer contour of the knob acceptance hole, in the middle of each of the knob coupling latching pawls 150 in the width direction, the knob coupling latching pawls 150 are formed as thin plates to easily flex outward when the shank of the knob 110 is inserted into the knob acceptance hole, thus facilitating insertion of the knob shank.

The channels 151 of the knob coupling latching pawls 150 of the knob base 109, furthermore, are in shapes that accept the projections formed in the latching shoulders of the shank of the knob 110 and are disposed at positions where those projections are accepted when the shank of the knob 110 is in the locked position. Consequently, one can feel a sensation in one's fingers when completing the turning to the locked position; this is also useful in securing the locked position. More specifically, the projections of the knob shank and the channels 151 of the knob base 109 are shaped such that, when the knob shank turns to the locked position, the projections elastically fit into and mate with the channels 151 according to the elasticity of the knob coupling latching pawls 150. By manipulating the knob 110, the operator definitely feels the clicking sensation of completing the securing operation by having turned to the locked position. The projections of the knob shank and the channels 151 of the knob base 190 are shaped such that the projections will fit into and mate with the channels 151 to fill them up in the lateral cross-section of the knob shank in the mated state. Consequently, turning in the locked position is locked, and play in the turning direction can be prevented.

In FIGS. 72 to 77, the knob 110 of the knob assembly 105 is illustrated. The knob 110 has a knob head 153 that abuts against the peripheral portion of the through hole 134 in (the first mat grommet 117 of) the second fastener 107 and a knob shank 154 inserted into the long hole 149 in the base apex part 147 of the knob base 109. In the knob shank 154, latching means are formed for latching to the knob base 109. The knob shank 154 is formed in a narrow plate shape that has a wide form for preventing the inward toppling of the base latching pawls 146 by the turning thereof by a prescribed angle (90 degrees in the embodiment shown) in the hollow interior of the knob base 109 and a thickness that does not prevent such inward toppling, and can turn about its axis to assume either a unlocked position at which the inward toppling of the base latching pawls 146 is not prevented, or a locked position at which the inward toppling of the base latching pawls 146 is prevented. For that reason, the knob shank 154 is a plate-shaped body that descends from the knob head 153 and is formed as a plate-shaped body of broad width with a size and a rectangular lateral cross-section so that it will pass through in the long side of the long hole 149 of the base apex part 147 of the knob base 109 but, in its shorter side will not separate by being pulled out. The knob head 153 is formed at the upper end (upper end in FIG. 72) of the knob shank 154, sized not to pass through the long hole 149 of the base apex part 147 of the knob base 109. In the top surface of the knob head 153, finger-gripping parts 155 are formed to facilitate the operation of turning the knob shank 154 between the unlocked position and the locked position.

In the knob shank 154, latching means are formed for coupling the knob 110 to the knob base 109 when the knob shank 154 is inserted into the knob base 109. These latching means are constituted by latching shoulders 157 that latch with the knob coupling latching pawls 150 of the knob base 109. These latching shoulders 157 may be of any form as long as they can latch with the knob coupling latching pawls 150 of the knob base 109. In the embodiment shown, these latching shoulders are formed by narrowing the width of the portion, in the wide part of the knob shank 154, corresponding to the positions to latch to the knob coupling latching pawls 150. Consequently, when the knob shank 154 is inserted into the knob base 109 and thoroughly pushed in, the knob coupling latching pawls 150 of the knob base 109 will latch on the latching shoulders 157 and the knob 110 will be coupled to the knob base 109. Furthermore, immediately after pushing in, the knob shank 154 will be in the unlocked position, allowing the base latching pawls 146 to topple inwardly, but the knob coupling latching pawls 150 are formed in semicircular tubular shape by the formation of the channels 151 (FIG. 69) and partially latch on the latching shoulders 157; thus, merely by inserting the knob shank into the knob base 109 and thoroughly pushing it in will the knob 110 be coupled to the knob base 109. After this pushing in, by turning the knob shank 154 through an angle of 90 degrees about its axis, the latching shoulders 157 will latch with the knob coupling latching pawls 150 over a wide surface area. By this turning, the knob shank 154 engages so that its wide part prevents the base latching pawls 146 from toppling inward, and the locked position is assumed. In this locked position, the coupling of the knob 110 and knob base 109 is definitely maintained.

In the latching shoulders 157 of the knob shank 154, projections 158 are formed which protrude from the latching shoulders 157 toward the knob head 153 in the axial direction and also in the radial direction. These projections 158 can fit in the axially directed channels 151 formed in the knob coupling latching pawls 150 of the knob base 109. More specifically, when the knob shank 154 is turned to the locked position, the wide part of the knob shank 154 engages so as to prevent the base latching pawls 146 from inwardly toppling, and the projections 158 fit into and mate with the channels 151. By this mating, since the knob shank 154 has been completely turned to the locked position, which the operator knows by placing his or her fingers on the knob head 153. By the mating of the projections 158 in the channels 151, moreover, the knob shank 154 is maintained in the locked position, so the knob 110 can be fixed in the locked position.

In FIGS. 76 to 78, the knob assembly 105 is illustrated with the knob 110 combined with the knob base 109. When the knob shank 154 is inserted into the knob base 109 and thoroughly pushed in, the knob coupling latching pawls 150 of the knob base 109 latch on the latching shoulders 157, and the knob 110 is coupled to the knob base 109. Immediately after this pushing in, the knob shank 154 will be in the unlocked position (indicated by solid lines in FIG. 78) in which the base latching pawls 146 are not prevented from inwardly toppling, but the knob coupling latching pawls 150 are formed in semi-circular tubular shapes (FIG. 69) and partially latch onto the latching shoulders 157; thus, the knob 110 will assume a state in which it is coupled to the knob base 109. After this pushing in, by turning the knob shank 154 by an angle of 90 degrees, the knob shank 154 will assume the locked position at which its wide part engages to prevent the base latching pawls 146 from inwardly toppling, as indicated by the dashed lines in FIG. 78; the latching shoulders 157 will latch with the knob coupling latching pawls 150 over a wide surface area, and the coupling of the knob 110 and knob base 109 will be definitely maintained.

The operation of securing the floor mat 106 to the carpet 102 using the fastening assembly 1 of such configuration shall now be described with reference to FIGS. 79 to 81 and FIGS. 41 to 43. As shown in FIG. 41, after the first carpet grommet 113 and second carpet grommet 114 of the first fastener 103 are attached to the carpet 102, the knob assembly 105, in which the knob 110 has been coupled to the knob base 109, is inserted into the first carpet grommet 113 of the first fastener 103. FIG. 79 shows the situation immediately prior to that insertion. The operator holds the knob head 153 and inserts the knob assembly 105 into the first fastener 103.

FIG. 80 shows the situation after insertion of the knob assembly 105. During insertion of the knob assembly 105, because the base latching pawls 146 of the knob base 109 are formed to readily flex inward, the operator can easily conduct the insertion operation. When that insertion is complete, the base latching pawls 146 latch on the latching shoulders 125 of the first carpet grommet 113, and the base flange 145 of the knob base 109 abuts against the flange 119 of the first carpet grommet 113; thus, the knob assembly 105 is definitely coupled to the first fastener 103. In FIG. 80, the knob assembly 105 is coupled to the first fastener 103, and by extension, the knob assembly 105 also is secured to the carpet 102. In this secured state, the knob 110 is in the unlocked position. In the knob assembly 105, moreover, the coupling between the knob 110 and knob base 109 depends on the latching between the latching shoulders 157 of the knob 110 and the knob coupling latching pawls 150 of the knob base 109. However, because the knob shank 154 is wide and the latching shoulders 157 become wide, and because the knob coupling latching pawls 150 can be formed so as to be wide, play in the direction indicated by the arrow 159 in FIG. 80 can be minimized.

The second fastener 107, comprising the first mat grommet 117 and the second mat grommet 118, is attached to the floor mat 106 as shown in FIG. 42. This floor mat 106 is pushed in, as is, with the second fastener 107 of the floor mat 106 superimposed on the first fastener 103 of the carpet 102, with the knob head 153 of the knob 110 passing through the through hole 134 of the first mat grommet 117, as illustrated in FIG. 43. After this pushing-in is completed, when the knob shank 154 of the knob 110 is turned by an angle of 90 degrees from the unlocked position to the locked position, the knob head 153 abuts the latching part 137 formed in the first mat grommet 117 of the second fastener 107 and pushes the second fastener 107 against the first fastener 103 in the axial direction. At the same time, the wide part of the knob shank 154 of the knob 110 prevents the base latching pawls 146 of the knob base 109 from inwardly toppling, and engagement between the base latching pawls 146 of the knob base 109 and the latching shoulders 125 of the first carpet grommet 113 that are the latching parts of the first fastener 103 is locked. Consequently, the floor mat 106 is secured to the carpet 102 by the fastening assembly 101 as shown in FIG. 81. Also, because the knob shank 154 is wide and engages the base latching pawls 146 of the knob base 109, play in the direction indicated by the arrow 161 in FIG. 81 can be minimized.

FIG. 82 illustrates another embodiment. In this embodiment, in a first carpet grommet 113A in a first fastener 103A, there are no latching shoulders for the base latching pawls 146 of the knob base 109 to latch on, but rather latching shoulders 162 on which the base latching pawls 146 of the knob base 109 latch are formed in a second carpet grommet 114A. Otherwise, the configuration is the same as that of the fastening assembly 1 previously described and therefore not further described here. With this first fastener 103A, the first carpet grommet 113A is disposed on the front surface of the carpet 102, the second carpet grommet 114A is disposed on the back surface of the carpet 102, and the knob base 109 of the knob assembly 105 is inserted from the first carpet grommet 113A into the second carpet grommet 114A, whereupon coupling is effected to the first fastener 103A. The latching shoulders 162 that are the latching parts for latching to the knob base 109 of the knob assembly 105 are formed in the second carpet grommet 114A, and the knob assembly 105 is coupled to the first fastener 103A. In this case, when a force is applied in the pull-out direction (arrow 163), the second carpet grommet 114A can strongly bear that force, which is an advantage.

In FIG. 83, a floor mat 11A attached to the carpet 2 by the fastening assembly 1 is formed to have an attachment part 55 attached to a body panel 54. Even if the shape of the floor mat 11A is modified, the fastening assembly in accordance with the present invention can definitely secure the floor mat to the carpet.

What is claimed is:

1. A fastening assembly for securing a floor mat to a carpet, comprising:
   a first fastener that attaches to the peripheral portion of an attachment hole in the carpet, the first fastener defining an axial through hole;
   a knob assembly that attaches to the first fastener by insertion thereof into the through hole in the first fastener; and
   a second fastener that attaches to the peripheral portion of an attachment hole in the floor mat, the second fastener defining a second axial through-hole; wherein:
   the knob assembly comprises a knob base, inserted into the through hole of the first fastener, and a knob coupled to the knob base, the knob having a knob shank;
   the knob base is formed as a tubular body inserted into the through hole of the first fastener, having a knob acceptance hole in its center for accepting the knob, in which is formed, on the outside surface of the portion inserted into the through hole of the first fastener, a base flange that abuts the peripheral portion of the through hole of the first fastener and base latching pawls for latching with a latching part formed in the inner wall of the through hole of the first fastener;
   the knob and knob base are formed so that when the knob is inserted into the knob base, the knob is coupled to the knob base to be able to turn about its axis inside the knob base; the knob comprises a knob head for abutting against the peripheral portion of the through hole in the second fastener and latching means that are inserted into the knob base for latching to the knob base; the knob shank is shaped so that when turned through a prescribed angle about the axis of the knob shank inside the knob base, the base latching pawls are prevented from toppling inward and is configured to be able to turn about its axis to between an unlocked position, in which the inward toppling is not prevented, and a locked position, in which the inward toppling is prevented; and
   in a state in which the first fastener is attached to the carpet, the second fastener is attached to the floor mat, the knob assembly is coupled to the first fastener so as not to turn about the axis of the knob shank, and the knob head of the knob passes through the through hole of the second fastener, the second fastener of the floor mat is superimposed on the first fastener of the carpet, and, in a state in which the knob has been turned about its axis from the unlocked position to the locked position, the knob head abuts a latching part formed in the second fastener and pushes the second fastener in the axial direction against the first fastener, whereby the engagement between the base latching pawls of the knob base and the latching part of the first fastener is locked, and the floor mat is secured to the carpet.

2. The fastening assembly according to claim 1, wherein in the knob shank and the knob base, latching means are formed for coupling the knob to the knob base when the knob shank is inserted into the knob base; the latching means of the knob base are formed by elastic knob coupling latching pawls that extend in the axial direction inside the knob base from the base apex part of the knob base; and the latching means of the knob shank are formed by latching shoulders for latching with the knob coupling latching pawls.

3. The fastening assembly according to claim 2, wherein the knob coupling latching pawls of the knob base are formed in an opposing pair, as elastic latching pawls that extend in the longitudinal direction along the inside wall of the knob acceptance hole into which the knob shank is inserted; and the knob coupling latching pawls are of sufficient size and strength to positively latch on the latching shoulders of the knob shank.

4. The fastening assembly according to claim 3, wherein in the latching shoulders of the knob shank, projections protruding in the axial direction from the latching shoulders are formed; in the knob coupling latching pawls of the knob base, channels are formed in the axial direction for accepting the projections; and the channels are disposed in positions where the projections are accepted when the knob shank is in the locked position.

5. The assembly according to claim 4, wherein the projections of the knob shank and the channels in the knob base are formed so that, when the knob shank is turned to the locked position, the projections are elastically mated in the channels by the elasticity of the knob coupling latching pawls.

\* \* \* \* \*